(12) United States Patent
Herre et al.

(10) Patent No.: US 8,538,037 B2
(45) Date of Patent: Sep. 17, 2013

(54) AUDIO SIGNAL DECORRELATOR, MULTI CHANNEL AUDIO SIGNAL PROCESSOR, AUDIO SIGNAL PROCESSOR, METHOD FOR DERIVING AN OUTPUT AUDIO SIGNAL FROM AN INPUT AUDIO SIGNAL AND COMPUTER PROGRAM

(75) Inventors: Jürgen Herre, Buckenhof (DE); Herbert Buchner, Nittendorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 579 days.

(21) Appl. No.: 12/296,698

(22) PCT Filed: Mar. 28, 2007

(86) PCT No.: PCT/EP2007/002759
§ 371 (c)(1),
(2), (4) Date: Dec. 19, 2008

(87) PCT Pub. No.: WO2007/118583
PCT Pub. Date: Oct. 25, 2007

(65) Prior Publication Data
US 2009/0304198 A1    Dec. 10, 2009

(30) Foreign Application Priority Data

Apr. 13, 2006 (EP) .................................. 06007833
Jun. 14, 2006 (EP) .................................. 06012271

(51) Int. Cl.
*H04B 15/00* (2006.01)
*H04M 9/08* (2006.01)
*H04M 1/00* (2006.01)
*H04M 1/38* (2006.01)

(52) U.S. Cl.
USPC ................ 381/94.3; 379/406.14; 455/570

(58) Field of Classification Search
USPC . 381/66, 93, 94.1, 94.3; 379/406.01–406.16; 370/289, 282–286; 455/570
See application file for complete search history.

(56) References Cited

U.S. PATENT DOCUMENTS 4,972,489 A * 11/1990 Oki et al. ...................... 381/97
5,230,022 A * 7/1993 Sakata .......................... 381/98

(Continued)

FOREIGN PATENT DOCUMENTS

EP     0 984 609 A2    3/2000
JP     2002-536933 A    10/2002

(Continued)

OTHER PUBLICATIONS

Hans Roder (Discussion on "Amplitude, Phase, and Frequency Modulation", Issue Date : May 1932) Yam (Innovative demodulation method for SSB technique, Issue Date : Aug. 1999) Kusumoto (Modulation enhancement of speech as a preprocessing for reverberant chambers with the hearing-impaired, Issue Date : 2000).*

(Continued)

*Primary Examiner* — Daniel Luke
*Assistant Examiner* — Khaja Ahmad
(74) *Attorney, Agent, or Firm* — Keating & Bennett, LLP

(57) ABSTRACT

An audio signal decorrelator for deriving an output audio signal from an input audio signal has a frequency analyzer for extracting from the input audio signal a first partial signal descriptive of an audio content in a first audio frequency range and a second partial signal descriptive of an audio content in a second audio frequency range having higher frequencies compared to the second audio frequency range. A partial signal modifier modifies the first and second partial signals, to obtain first and second processed partial signals, so that a modulation amplitude of a time variant phase shift or time variant delay applied to the first partial signal is higher than that applied to the second partial signal, or for modifying only the first partial signal. A signal combiner combines the first and second processed partial signals, or combines the first processed partial signal and the second partial signal, to obtain an output audio signal.

30 Claims, 10 Drawing Sheets

(56) References Cited

U.S. PATENT DOCUMENTS

| | | | | |
|---|---|---|---|---|
| 5,742,679 | A | * | 4/1998 | Olafsson ................... 370/527 |
| 5,748,751 | A | * | 5/1998 | Janse et al. ................. 381/93 |
| 6,577,731 | B1 | | 6/2003 | Sugiyama |
| 6,700,977 | B2 | | 3/2004 | Sugiyama |
| 6,760,448 | B1 | | 7/2004 | Gundry |
| 6,895,093 | B1 | | 5/2005 | Ali |
| 7,519,187 | B2 | * | 4/2009 | Konagai ..................... 381/98 |
| 2004/0125967 | A1 | * | 7/2004 | Eid et al. .................... 381/99 |
| 2005/0047609 | A1 | * | 3/2005 | Buchner et al. ............. 381/66 |
| 2006/0188101 | A1 | * | 8/2006 | Gunnarsson ................. 381/1 |

FOREIGN PATENT DOCUMENTS

| | | |
|---|---|---|
| WO | 2005/086139 A1 | 9/2005 |
| WO | 2005/091678 A1 | 9/2005 |
| WO | 2005/117409 A1 | 12/2005 |
| WO | 2006/019719 A1 | 2/2006 |

OTHER PUBLICATIONS

Official communication issued in counterpart International application No. PCT/EP2007/002759, mailed on May 18, 2007.

Benesty et al.: "A Better Understanding and an Improved Solution to the Specific Problems of Stereophonic Acoustic Echo Cancellation," IEEE Transactions on Speech and Audio Processing; vol. 6, No. 2; Mar. 1998; pp. 156-165.

Hänsler: "The Hands-Free Telephone Problem—An Annotated Bibliography," Singal Processing; vol. 27, No. 3; Dec. 1991; pp. 259-271.

Kellerman: "Kompensation Akustischer Echos in Frequenzteilbändern," Proc. Aachener Kolloquium; pp. 322-325.

Shimauchi et al.: "Stereo Projection Echo Canceller With True Echo Path Estimation," Proceedings of the IEEE International Conference on Acoustics, Speech, and Signal Processing; May 1995; pp. 3059-3062.

Gänsler et al.: "Stereophonic Acousit Echo Cancellation and Two-Channel Adaptive Filtering: An Overview," International Journal of Adaptive Control and Signal Processing; vol. 14; 2000; pp. 565-586.

Buchner et al.: "Acoustic Echo Cancellation for Two and more Reproduction Channels," International Workshop on Acoustic Echo and Noise Control; Sep. 2001; pp. 99-102.

Sugiyama et al.: "A Stereo Echo Canceler With Correct Echo-Path Identification Based on an Input-Sliding Technique," IEEE Transactions on Signal Processing; vol. 49, No. 11; Nov. 2001; pp. 2577-2587.

Sondhi et al.: "Stereophonic Acoustic Echo Cancellation—An Overview of the Fundamental Problem," IEEE Signal Processing Letters; vol. 2, No. 8; Aug. 1995; pp. 148-151.

Morgan et al.: "Investigation of Several Types of Nonlinearities for Use in Stereo Acoustic Echo Cancellation," IEEE Transactions on Speech and Audio Processing; vol. 9, No. 6; Sep. 2001; pp. 686-696.

Gänsler et al.: "Influence of Audio Coding on Stereophonic Acoustic Echo Cancellation," Proceedings of the International Conference on Acoustics, Speech, and Signal Processing; 1998; pp. 3649-3652.

Benesty et al.: "Stereophonic Acoustic Echo Cancellation Using Nonlinear Transformations and Comb Filtering," Proceedings of the International Conference on Acoustics, Speech, and Signal Processing; 1998; pp. 3673-3676.

Neubauer et al.: "Digital Watermarking and It'S Influence on Audio Quality," AES Convention; 1998; 16 pages.

Blauert: "Spatial Hearing: The Psychophysics of Human Sound Localization," Revised Edition; MIT Press; 1997; 21 pages.

Baumgarte et al.: "Binaural Cue Coding-Part I: Psychoacoustic Fundamentals and Design Principles," IEEE Transactions on Speech and Audio Processing; vol. 11, No. 6; Nov. 2003; pp. 509-519.

Faller et al.: "Binaural Cue Coding. Part II: Schemes and Applications," IEEE Transactions on Speech and Audio Processing; vol. 11, No. 6; Nov. 2003; pp. 1-12.

Hoya et al.: "Low Complexity $\epsilon$-NLMS Algorithms and Subband Structures for Stereophonic Acoustic Echo Cancellation," International Workshop in Acoustic Echo and Noise Control; 1999; pp. 36-39.

Breining et al.: "Acoustic Echo Control an Application of Very-High-Order Adaptive Filters," IEEE Signal Processing Magazine; Jul. 1999; pp. 42-69.

Official Communication issued in corresponding Japanese Patent Application No. 2009-504598, mailed on Dec. 20, 2012.

* cited by examiner

AUDIO SIGNAL DECORRELATOR, MULTI CHANNEL AUDIO SIGNAL PROCESSOR, AUDIO SIGNAL PROCESSOR, METHOD FOR DERIVING AN OUTPUT AUDIO SIGNAL FROM AN INPUT AUDIO SIGNAL AND COMPUTER PROGRAM

BACKGROUND OF THE INVENTION

The present invention is generally related to an audio signal decorrelator, a multi channel signal processor, a five channel audio signal processor, a method for deriving an output audio signal from an input audio signal and a computer program. In particular, the present invention is directed at a convergence enhancement for acoustic echo cancellation (AEC).

In the context of telecommunications and other applications, the problem of acoustic crosstalk between a loudspeaker, which is emitting sound, and a microphone, which is active simultaneously to pick up sound from the same acoustic environment is well-known. As a solution, technology for acoustic echo cancellation (AEC) has been proposed in the past, both for reproduction of a single sound channel ("single-channel AEC") and for reproduction of two audio channels ("stereo AEC").

With respect to single channel AEC, reference is taken to the following publications, a detailed list of which is included in the appendix of the present application: [Hae92], [Bre99], [Kel84]. With respect to stereo AEC, reference is taken to the following publications: [Shi95], [Gae00], [Buc01], [Sug01].

FIG. 9 shows a generic diagram of an AEC application. FIG. 9 describes a typical scenario for stereo AEC. The system of FIG. 9 is designated in its entirety with 900. From a transmitting room 910, a sound source, e.g. a speaker 912, is picked up via two microphones 920, 922. A relation between the sound transmitted by the speaker 912 and the sound received by the two microphones 920, 922 is described by transfer functions $g_1(k)$, $g_2(k)$. In other words, the transfer functions $g_1(k)$, $g_2(k)$ are for example influenced by the acoustic characteristics of the transmitting room 910 (e.g. reflections) and by a distance between the speaker 912 and the two microphones 920, 922. The microphone signals $x_l(k)$, $x_p(k)$ are transmitted to a receiving room 930, and are reproduced via two loudspeakers 932, 934.

At the same time, a microphone 940 in the receiving room 930 is set up to pick up speech from another user 942, who is present in the receiving room. Sound signals emitted by the first speaker 932 couple to the microphone 940, wherein a transmission characteristic between the first speaker 932 and the microphone 940 is designated with $h_l(k)$. Also, an acoustic signal produced by the second speaker 934 is coupled to the microphone 940, wherein a transfer characteristic between the second speaker 934 and the microphone 940 is designated with $h_p(k)$.

In order to prevent sound emitted from the two speakers 932, 934 coupling into the outgoing microphone signal (which is, for example, sent back to a far end listener, e.g. a human and/or a machine), AEC 950 attempts to cancel out any contributions of the incoming signals $x_l(k)$, $x_p(k)$ from the outgoing signal e(k) by subtracting filtered versions of the incoming signals $x_l(k)$, $x_p(k)$ from the outgoing one (e.g. from the microphone signal y(k) of the microphone 940).

In other words, the received signal $x_l(k)$ is filtered using a filter function $\hat{h}_l(k)$, and the result of the filtering is subtracted from the microphone signal y(k). Also, the signal $x_p(k)$ is filtered with a filter function $\hat{h}_p(k)$. The result of this filtering is further subtracted from the microphone signal y(k), so that a corrected microphone signal e(k) is obtained by subtracting the filtered versions of the signals $x_l(k)$, $x_p(k)$ from the microphone signal y(k). Canceling out (or at least reducing) contributions of the incoming signals $x_l(k)$, $x_p(k)$ from the outgoing signal e(k) generally necessitates that the cancellation filters 952, 954 are dynamically adjusted by an adaptation algorithm to achieve a minimum error signal e(k), and thus optimum cancellation.

It is known that this is the case when the adapted cancellation filters 952, 954 are an accurate model of the transfer characteristics (transfer function $h_p(k)$, $h_l(k)$, or impulse response) between the emitting speakers 932, 934 and the microphone 940.

Two important areas of application for AEC are hands-free telephony (where a far-end listener is another human being located at the remote end of the telephone) or microphone signal enhancement for automatic speech recognition (ASR). In the latter case, the objective is to remove the influence of other sound reproduced in the room from the microphone signal in order to enable operation of an automatic speech recognizer with low recognition error rates. As an example, music from a HiFi setup may be removed from the input of a voice command module to allow reliable control of certain functions by spoken user commands.

It has further been shown that for the case of stereo AEC, a so-called "non-uniqueness problem" exists [Son95]: If both loudspeaker signals are strongly correlated, then the adaptive filters generally converge to a solution ($\hat{h}_p(k)$, $\hat{h}_l(k)$) that does not correctly model the transfer functions $h_p(k)$, $h_l(k)$ between the speakers 932, 934 and the microphone 940, but merely optimizes echo cancellation for given particular loudspeaker signals. As a consequence, a change in the characteristics of a loudspeaker signal $x_l(k)$, $x_p(k)$ (e.g. due to a change of a geometric position of the sound source 912 in the transmitting room 910) results in a breakdown of the echo cancellation performance and necessitates a new adaptation of the cancellation filters.

As a solution of this non-uniqueness problem, various techniques have been proposed to preprocess the signals from the transmitting room 910 before their reproduction in the receiving room 930 in order to "decorrelate" them, and in this way avoid the previously discussed ambiguity.

The requirements for such preprocessing schemes can be summarized as follows:
Convergence enhancement: the preprocessing may be able to decorrelate the input signals effectively to ensure rapid and correct AEC filter convergence even for highly correlated/monophonic (input-) signals.
Subjective sound quality: since the preprocessed signals are subsequently reproduced via loudspeakers and listened to by users 942 in the receiving room 930, the preprocessing may not introduce any objectionable artifacts for the type of audio signals used. The type of audio signals may for example be speech-only for hands-free telecommunication applications, or any type of audio material including music is used for ASR input enhancement.
Implementation complexity: in order to enable economic use of preprocessing in inexpensive consumer equipment, a very low computational and memory complexity is desirable.

A further differentiating characteristic of preprocessing techniques is the capability of generalizing to multi-channel operation, i.e., handling more than two reproduced channels of audio.

In the following, known preprocessing concepts for acoustic echo cancellation (AEC) will be described.

A first simple preprocessing method for stereo AEC was proposed by Benesty et al. (conf. [Ben98], [Mor01]), and achieves a decorrelation of the signals by adding non-linear distortions to the signals. The non-linear distortions are for example created by a half-way rectification, full-way rectification or by forming a square-root.

FIG. 10 shows a block schematic diagram and transfer functions of a preprocessing by means of a non-linearity. The graphic representation of FIG. 10 is designated in its entirety with 1000. A first graphic representation 1010 shows a block schematic diagram of a preprocessing unit using half-way rectification units 1020, 1022. In other words, FIG. 10 illustrates a decorrelation of the signals $x_1(k)$, $x_2(k)$ for a common case of half-way rectification.

A second graphical representation 1050 describes a transfer characteristic between input signals $x_1$, $x_2$ and output signals $x_1'$, $x_2'$. An abscissa 1060 describes the input values $x_1$, $x_2$. An ordinate 1062 describes the output values $x_1'$, $x_2'$. A first curve 1070, which comprises a sharp bend at the origin of the $x_1$, $x_1'$ coordinate system, reflects a relationship between the input value $x_1$ and the corresponding output value $x_1'$. A second curve 1072, which comprises a sharp bend in the origin of the $x_2$, $x_2'$ coordinate system, describes a transfer characteristic between the input signal $x_2$ and the corresponding output signal $x_2'$.

In other words, FIG. 10 illustrates the addition of non linear distortion to the input signals $x_1$, $x_2$ to form the output signals $x_1'$, $x_2'$ for the common case of a half-way rectification.

While the described scheme (of adding non linear distortions) possesses extremely low complexity, the introduced distortion products can become quite audible and objectionable, depending on the type of audio signal processed. Typically, the degradation in sound quality is considered acceptable for speech or communication applications, but not for high-quality applications for music signals.

A second known approach consists of the addition of uncorrelated noise to the signals (e.g. to the two input signals $x_1$, $x_2$). In [Gae98], this is achieved by perceptual audio coding/decoding of the signal, which introduces uncorrelated quantization distortion into each signal such that it is masked due to the noise shaping that is carried out inside the perceptual audio coder according to a psycho-acoustic model. In order to introduce uncorrelated noise into both channels, no joint stereo coding may be used.

A similar effect can be achieved by using a perceptually controlled watermarking scheme, e.g. based on spread spectrum modulation (conf. [Neu98]). In this case, uncorrelated spread-spectrum data signals are embedded into the original signal instead of quantization noise.

For both approaches described above, the use of an explicit psycho-acoustic model in conjunction with analysis/synthesis filterbanks is able to prevent audible distortions for arbitrary types of audio signals. However, the associated implementation complexity and the introduced delay render this approach economically unattractive for most applications.

A third published approach to AEC preprocessing is to use complementary comb filtering on two output signals, which suppresses complementary spectral parts within the signals and in this way breaks the correlation between them (conf. [Beb98]). However, this type of processing generally leads to unacceptable degradations of the stereo image perceived by human listeners, which makes the described processing unsuited for high quality applications.

Still other approaches employ time-varying time-delays or filtering which is switched on and off (conf. [Sug98], [Sug99]), or time-varying all-pass filtering (conf. [Ali05]) to produce a time-varying phase shift/signal delay between the two signals of a stereo AEC and thus "decorrelate" both signals.

U.S. Pat. Nos. 6,700,977 B2 and 6,577,731 B1 (also designated as [Sug98] and [Sug99]) describe preprocessing systems in which the output signal switches between the original signal and a time-delayed/filtered version of it. As a disadvantage, this switching process may introduce unintended artifacts into the audio signal.

U.S. Pat. No. 6,895,093 B1 (also designated as [Ali05]) describes a preprocessing system in which an all-pass preprocessor is randomly modulated in its all-pass filter variable.

While these types of preprocessing are rather unobtrusive in their effects on the audio signal as compared to other methods in general, it is difficult to achieve maximum decorrelation while guaranteeing that introducing a (varying) time/phase difference between left and right channel does not result in a perceived shift/alteration of the perceived stereo image.

SUMMARY

According to an embodiment, an audio signal decorrelator for deriving an output audio signal from an input audio signal may have a frequency analyzer for extracting a first partial signal and a second partial signal from the input audio signal, the first partial signal being descriptive of an audio content in a first audio frequency range, the second partial signal being descriptive of an audio content in a second audio frequency range, the first audio frequency range having higher frequencies compared to the second audio frequency range; a partial signal modifier for modifying the first partial signal, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or for modifying only the first partial signal, so that a time variant phase shift or a time variant delay is applied to the first partial signal; and a signal combiner for combining the first processed partial signal and the second processed partial signal, or for combining the first processed partial signal and the second partial signal, to acquire an output audio signal.

According to an embodiment, a multi channel audio signal processor for decorrelating a first channel audio signal and a second channel audio signal, to acquire a first decorrelated output audio signal and a second decorrelated output audio signal may have a first audio signal decorrelator as mentioned above, wherein the first audio signal decorrelator is adapted to receive as the input audio signal the first channel audio signal, and wherein the output audio signal of the first audio signal decorrelator forms the first decorrelated output audio signal; wherein the second channel audio signal or a signal derived therefrom forms the second decorrelated output audio signal; and wherein the first audio signal decorrelator is adapted such that audio contents in the first audio frequency range of the first decorrelated output audio signal and of the second decorrelated output audio signal have a stronger time-variant phase shift modulation with respect to each other than audio contents in the second audio frequency range of the first decorrelated output audio signal and of the second decorrelated audio output signal.

According to an embodiment, an audio signal processor for receiving a first channel audio signal, a second channel audio signal, a third channel audio signal, a fourth channel audio signal and a fifth channel audio signal being part of a multi channel audio signal may have a first multi channel audio signal processor as mentioned above, wherein the first multi channel audio signal processor receives as its first channel audio signal the first channel audio signal of the multi channel signal, and wherein the first multi channel audio signal processor receives as its second channel audio signal the second channel audio signal of the multi channel signal; a second multi channel audio signal processor as mentioned above, wherein the second multi channel audio signal processor receives as its first channel audio signal the third channel audio signal of the multi channel signal, and wherein the second multi channel audio signal processor receives as its second channel audio signal the fourth channel audio signal of the multi channel signal; and an audio signal decorrelator as mentioned above, wherein the audio signal decorrelator receives as its input audio signal the fifth channel audio signal of the multi channel signal, the output signals of the first multi channel audio signal processor, the second multi channel audio signal processor and the audio signal decorrelator forming a decorrelated five channel signal.

According to an embodiment, an audio conference system may have an audio input for receiving a first channel audio signal and a second channel audio signal; a multi channel audio signal processor as mentioned above, the multi channel audio signal processor receiving the first channel audio signal and the second channel audio signal; a first electroacoustic transducer for outputting the first decorrelated output audio signal provided by the multi channel audio signal processor; a second electroacoustic transducer for outputting the second decorrelated output audio signal provided by the multi channel audio signal processor; a microphone acoustically coupled with a first electroacoustic transducer an a second electroacoustic transducer, the microphone providing a microphone signal descriptive of the acoustic signal; an echo cancellation unit for reducing or removing an audio content output by the first electroacoustic transducer from the microphone signal, and for reducing or removing an audio content output by the second electroacoustic transducer from the microphone signal, wherein the echo cancellation unit is adapted to filter the decorellated output audio signals in dependence on filter coefficients, to remove or subtract the filtered version of the decorrelated output audio signals from the microphone signal, to acquire a echo-reduced microphone signal, and to adjust the filter parameters in dependence on the echo-reduced microphone signal, to minimize an audio content output by the electroacoustic transducers in the echo-reduced microphone signal.

According to an embodiment, a method for deriving an output audio signal from an input audio signal may have the steps of extracting a first partial signal and a second partial signal from the input audio signal, the first partial signal being descriptive of an audio content in a first audio frequency range, the second partial signal being descriptive of an audio content in a second audio frequency range, the first audio frequency range having higher frequencies compared to the second audio frequency range; modifying the first partial signal, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or modifying only the first partial signal, so that a time variant phase shift or a time variant delay is applied to the first partial signal; and combining the first processed partial signal and the second processed partial signal, or combining the first processed partial signal and the second partial signal, to acquire an output audio signal.

According to an embodiment, a method for processing a multi channel audio signal may have the steps of receiving a first channel audio signal, a second channel audio signal, a third channel audio signal, a fourth channel audio signal and a fifth channel audio signal being part of a multi channel audio signal; decorrelating the first channel audio signal and the second channel audio signal of the five channel audio signal using a method as mentioned above, to acquire two signals of a decorrelated multi channel signal; decorrelating the third channel audio signal and the fourth channel audio signal of the multi channel audio signal using a method as mentioned above, to acquire two further signals of the processed multi channel signal; and decorrelating the fifth channel audio signal of the multi channel audio signal using a method as mentioned above, to acquire a fifth signal of the processed multi channel signal.

According to an embodiment, a Computer program may have a program code for performing one of the above mentioned methods, when the computer program runs on a computer.

The present invention creates an audio signal decorrelator for deriving an output audio signal from an input audio signal. The audio signal decorrelator comprises a frequency analyzer for extracting a first partial signal and a second partial signal from the input audio signal, the first partial signal being descriptive of an audio content in a first audio frequency range, the second partial signal being descriptive of an audio content in a second audio frequency range. The first audio frequency range has higher frequencies compared to the second audio frequency range.

The audio signal decorrelator further comprises a partial signal modifier for modifying the first partial signal, to obtain a first processed partial signal, and for modifying the second partial signal, to obtain the second processed partial signal, so that a modulation amplitude of a time variant phase shift or time variant delay is applied to the first partial signal which is higher than a modulation amplitude of a time variant phase shift or a time variant delay applied to the second partial signal, or for (time-variantly) modifying only the first partial signal so that a time variant phase shift or delay is applied to the first partial signal. The audio signal decorrelator further comprises a signal combiner for combining the first processed partial signal and the second processed partial signal, or for combining the first processed partial signal and the second partial signal, to obtain the output audio signals.

The inventive audio signal decorrelator allows for a decorrelation of an audio signal which is adapted to a human auditory perception in that the audio signal decorrelation is performed such that a hearing impression of the output audio signal is not severely degraded with respect to the hearing impression of the input audio signal. Further, the inventive audio signal decorrelator comprises lower computational complexity when compared to other audio signal decorrelators having similar performance.

It is the key idea of the present invention that it is advantageous to introduce a larger delay modulation or phase shift modulation into a first audio frequency range comprising higher frequencies when compared to a second audio frequency range only comprising lower frequencies, as it was found that the human auditory perception is more sensitive to phase shifts in an audio frequency range of lower frequencies when compared to an audio frequency range of higher frequencies.

It is further a key finding of the present invention that an audio signal decorrelation adapted to the human hearing can be reached by analyzing the input audio signal to extract at least a first partial signal and a second partial signal from the input audio signal, and to apply different time-varying delays or phase shift modulations to the first partial signal and to the second partial signal.

It should be noted that the term "two" is used in the meaning of "at least two" throughout the present application. Further, the term "multi channel" is used to designate a stereo signal (or a two channel signal) or a signal comprising more than two channels.

In a first implementation, a first time varying phase shift or a first time varying delay is applied to the first partial signal, and a second time varying phase shift or a second time varying delay is applied to the second partial signal, wherein the maximum modulation amplitude of the first time-variant phase shift or time-variant delay is larger than the second phase shift or delay in its modulation amplitude. As a consequence the first partial signal comprises a larger modulation amplitude of a time variant phase shift or delay than the second partial signal, which is reflected in the output audio signal formed by combining the first partial signal and the second partial signal. Thus, the output audio signal comprises larger time variant phase shifts in the first frequency range when compared to the second frequency range, with respect to a modulation amplitude. Accordingly, the output audio signal exhibits a maximum decorrelation impact while not exceeding the thresholds of human auditory perception, as in the first audio frequency range, which comprises higher frequencies than the second audio frequency range, the human perception is less sensitive to phase variations than in the second audio frequency range (wherein it is assumed that the second audio frequency range comprises lower frequencies than the first audio frequency range). Thus, the present invention allows for a frequency dependent (or frequency-range selective) adjustment of the time variant phase shift or the time variant delay, as the time variant phase shift or time variant delays are applied to a plurality of partial signals representing the audio content in different audio frequency ranges of the input audio signal.

In a second embodiment, a time variant phase shift or time variant delay is only applied to the first partial signal, while the second partial signal merely experiences a time invariant processing (or no processing at all). In this way, it is achieved that in the first audio frequency range a larger time variant phase shift or time variant delay is introduced when compared to the second audio frequency range (wherein no time variant phase shift of time variant delay is introduced in the second frequency range). This embodiment is particularly advantageous, if the second audio frequency range comprises frequencies below a certain frequency threshold (e.g. of the order of 400 Hz or 1 kHz), wherein it was found that for such particularly low frequencies an introduction of a phase shift has particularly strong effects on the human auditory perception.

In other words, the present invention allows to selectively introduce a larger time variant phase shift or time variant delay into the first audio frequency range when compared to the second audio frequency range, thus allowing to set the amplitude of the time variant phase shift or time variant delay as a function of frequency in accordance with the characteristics of the human auditory perception and further in accordance with the requirement for achieving a maximum decorrelation.

By allowing for a frequency dependent amplitude of the time variant phase shift or delay, the full potential of perceptually tolerable time variant phase shift or time variant delay can be exploited. Accordingly, the fact that the sensitivity of the human to phase differences, which is very high at low frequencies and gradually reduces for increasing frequencies, until it fully vanishes for frequencies above about 4 kHz, is strongly frequency dependent, can be considered easily in the design of an inventive audio signal decorrelator.

In an embodiment, the frequency analyzer comprises an analysis filterbank adapted to decompose the input audio signal into at least two spectral coefficients, a first spectral coefficient being descriptive of an audio content in the first audio frequency range, the first spectral coefficient forming the first partial signal, and a second spectral coefficient being descriptive of an audio content in the second audio frequency range, the second spectral coefficient forming the second partial signal. The partial signal modifier is adapted to time-variantly modify a phase at least the first spectral coefficient, to obtain the first processed partial signal. Alternatively, the partial signal modifier is adapted to time-variantly modify the phase of the first spectral coefficient to obtain the first processed partial signal, and a phase of the second spectral coefficient, to obtain a second processed partial signal.

The signal combiner comprises a synthesis filterbank adapted to convert (and/or combine) the processed first partial signal and the second partial signal to obtain the output audio signal as a time domain signal, or to convert (and/or combine) the processed first partial signal and the processed second partial signal to obtain the output audio signal as the time domain signal.

In other words, in an embodiment the input audio signal is decomposed into a frequency domain representation comprising at least a first spectral coefficient and a second spectral coefficient, the first spectral coefficient and the second spectral coefficient describing different audio frequency ranges. Thus, the spectral coefficients describe a magnitude and a phase of audio signal contents in the first audio frequency range and in the second audio frequency range. Thus, the different spectral coefficients constitute a particularly well-suited intermediate quantity for the introduction of a time variant phase shift. An arbitrary phase shift can be introduced by merely modifying the spectral coefficients, while it is not essential to provide an adjustable delay operation (as would be essential for achieving a phase shift in the time domain).

In another embodiment, the frequency analyzer is adapted to provide the spectral coefficients as complex values. In this case, the partial signal modifier is adapted to time variantly modify a phase of the first spectral coefficient by multiplying (or dividing) the first spectral coefficient or the first spectral coefficients with (or by) complex values of a first plurality of time variant complex values having a predetermined, identical, time invariant magnitude and a time variant phase. In other words, by using complex values (i.e. complex-valued spectral coefficients) to represent the audio signal content in the different audio frequency ranges, the introduction of the time variant phase shift can be achieved by merely performing a multiplication or division operation. Thus, the essential hardware or software effort is particularly low.

In another embodiment, the audio signal decorrelator comprises a modulation function generator, the modulation function generator producing a time variant modulation function. The audio signal decorrelator is in this case adapted to derive the time variant phase of the complex values of the first plurality of time variant complex values from the values of the modulation function at different instances of time. Thus, the time variant phase shift introduced into the first audio frequency range is determined by the modulation function.

In another embodiment, the modulation function generator is adapted to produce a smooth modulation function. This is particularly advantageous, as it was found that an abrupt change of the phase shift introduced into the first partial signal or the second partial signal results in audible artifacts, for example a strong frequency modulation or audible clicks.

In another embodiment, the partial signal modifier is adapted to time variantly modify a phase of the second partial signal by multiplying (or dividing) the second spectral coefficient or the second spectral coefficient with (or by) a second plurality of time variant complex values having a predetermined, identical, time-invariant magnitude and a time variant phase. The audio signal decorrelator is advantageously adapted to derive the time variant phase of the complex values of the second plurality of time variant complex values from values of the modulation function at different instances in time. In other words, it is advantageous to determine the time variation of the phase of the first spectral coefficient and the time variation of the phase of the second spectral coefficient by the same modulation function.

Further, as was discussed before, the time variant phase variation of the first spectral coefficients should be larger than the time variation of the phase of the second spectral coefficients. Thus, the time variant phase shift (or phase-shift value) applied to the second spectral coefficient (or the first spectral coefficients) is typically derived in a different way from the modulation function when compared to phase shift (or phase shift values) applied to the first spectral coefficient (or the first spectral coefficients).

Thus, in an embodiment the audio signal decorrelator comprises a scaler adapted to scale the periodic modulation function (which is a function of time, and therefore also designated as "time function") using a first time-invariant scalar value, to obtain the time variant phase of the complex values of the first plurality of time variant complex values. Furthermore, the scaler is adapted to scale the periodic modulation (time-) function with a second time-invariant scalar value, to obtain the time variant phase of the complex values of the second plurality of time variant complex values. An absolute value or a magnitude of the first scalar value is advantageously larger than an absolute value or a magnitude of the second scalar value, such that a phase shift applied to the first partial signal is larger than a phase shift applied to the second partial signal. Thus, the respective time variant phase shift (of the first partial signal and the second partial signal) can be achieved in an efficient way, merely by scaling (or multiplying) values of the modulation time function with the fist scalar value and the second scalar value. Consequently, the phase shift introduced in the first audio frequency range is proportional to (but larger than) the phase shift introduced in the second audio frequency range. This results in a particularly good perception impression of the output audio signal, and further in a particularly efficient implementation structure.

The present invention further comprises a multi channel audio signal processor for decorrelating a first channel audio signal and a second channel audio signal, to obtain two decorrelated audio signals. The multi channel audio signal processor comprises a first audio signal decorrelator as described above. The first audio signal decorrelator is adapted to receive as its input audio signal the first channel audio signal. The multi channel audio signal processor and the first audio signal decorrelator are adapted such that audio contents in the first audio frequency range of the output audio signal of the first audio signal decorrelator and of the second channel audio signal (or a signal derived from the second channel audio signal) comprise a larger time variant phase shift modulation with respect to each other than audio contents in the second audio frequency range of the output audio signal of the first audio signal decorrelator and the second channel audio signal (or a signal derived from the second channel audio signal), if the first channel audio signal and the second channel audio signal comprise a time-constant or vanishing phase shift in the first audio frequency range and in the second audio frequency range.

In other words, the inventive multi channel audio signal processor, which may for example be a stereo audio signal processor, comprises an inventive audio signal decorrelator, thus allowing for a frequency selective introduction of time variant phase shift modulation in different frequency bands (e.g. in the first audio frequency range and the second audio frequency range). Furthermore, in order to be adapted to the human auditory perception, the multi channel audio signal processor is adapted such that a modulation amplitude of a time variant phase shift or delay between output signals of the multi channel audio signal processor in the first audio frequency range is larger than a modulation amplitude of a time variant phase shift or delay between output signals of the multi channel audio signal processor in the second audio frequency range.

Thus, by decomposing the first channel audio signal (and possibly also the second channel audio signal) into a plurality of audio frequency ranges, a frequency selective processing is achieved, which allows to adjust phase shifts between the two output signals of the multi channel audio signal processor to be larger in the first audio frequency range than in the second audio frequency range.

Thus, the multi channel audio signal processor for example allows for a decorrelation of a stereo signal (comprising a first channel audio signal and a second channel audio signal), so that a modulation amplitude of a time or phase shift introduced between the two stereo channels is larger for higher frequencies than for lower frequencies. Due to the separation of at least one of the stereo signals (e.g. the first channel audio signal) into different audio frequency ranges, a flexible adjustment of a magnitude of the phase shift in different audio frequency ranges is possible, and an efficient implementation of the multi channel audio signal processor can be achieved.

In another embodiment, the multi channel audio signal processor comprises a second audio signal decorrelator receiving the second channel audio signal and outputting a second decorrelated audio signal. Thus, the first channel audio signal is processed by the first audio signal decorrelator to obtain the first decorrelated output audio signal, and the second channel audio signal is processed by the second audio signal decorrelator to obtain the second decorrelated output audio signal. The first audio signal decorrelator and the second audio signal decorrelator operate in parallel on the first channel audio signal and the second channel audio signal, wherein it can be ensured that a modulation amplitude of a time variant phase shift between the audio content in the first audio frequency range of the first decorrelated output audio signal and the second decorrelated output audio signal is larger than a modulation amplitude of a time variant phase shift between the audio signal content in the second audio frequency range of the first decorrelated output audio signal and the second decorrelated output audio signal, provided the first channel audio signal and the second channel audio signal exhibit a time constant or vanishing phase shift in the first audio frequency range and the second audio frequency range (e.g. if the first channel audio signal and the second channel audio signal are identical). In other words, the inventive multi channel signal processor ensures that the modulation amplitude of the time variant phase shift between higher frequency audio content in the two channels is larger than the modulation amplitude of time variant phase shifts between lower frequency audio content of the two channels.

In another embodiment, the first audio signal decorrelator is adapted to adjust the time variant delay or time variant phase shift in its first audio frequency range based on a first phase shift value, and to adjust the time variant delay or time variant phase shift in its second audio frequency range based on a second phase shift value. The second audio signal decorrelator is adapted to adjust the time variant phase shift or the time variant delay in its first audio frequency range based on a third phase shift value, and to adjust the time variant phase shift or a time variant delay in its second audio frequency range based on a fourth phase shift value. The multi channel signal processor further comprises the scaler adapted to derive the first phase shift value, the second phase shift value, the third phase shift value and the fourth phase shift value from a common modulation time function by scaling the modulation time function. In other words, in an embodiment the time variant delay or time variant phase shift introduced in the two audio signal decorrelators is derived from one common modulation time function. Thus, it can be achieved that time-coordinated or symmetrical (or anti-symmetrical) phase shifts are introduced into the two channels of the multi channel audio signal processor, resulting in a particularly well-balanced or symmetrical (or anti-symmetrical) output signal. Phase variations in different frequency ranges are synchronized between the two audio channels. This is particularly important, as phase variations can be perceived as a frequency modulation of the signals. However, an uncoordinated frequency modulation, which is different in the two audio signal channels (e.g. left stereo channel and right stereo channel) would result in particularly strongly perceivable distortions. Furthermore, an uncoordinated frequency modulation in different audio frequency ranges of a single audio channel would also result in quite audible artifacts, as human perception is particularly sensitive to frequency relations. Thus, a synchronized phase shift in different audio frequency bands, coordinated by a single modulation time function, is an important measure to avoid audible artifacts.

The present invention further comprises an audio conference system. The audio conference system comprises an audio input for receiving a first channel audio signal and a second channel audio signal. The audio conference system further comprises a multi channel signal processor, as described above. Moreover, the audio conference system comprises a first electroacoustic transducer for outputting the output audio signal of the first audio signal decorrelator, a second electroacoustic transducer for outputting the second channel audio signal or a signal derived therefrom, and a microphone acoustically coupled with the first electroacoustic transducer and the second electroacoustic transducer, the microphone providing a microphone signal descriptive of the received acoustic signal. The audio conference system further comprises an echo cancellation unit for reducing or removing an audio content output by the first electroacoustic transducer from the microphone signal, and for reducing or removing an audio content output by the second electroacoustic transducer from the microphone signal. The echo cancellation unit is adapted to adjust echo cancellation parameters on the basis of a comparison of the microphone signal, the signal output by the first electroacoustic transducer and the signal output by the second electroacoustic transducer.

According to the present invention, the echo cancellation unit operates with particularly good cancellation characteristics, as the first decorrelated output audio signal output by the first electroacoustic transducer and the second decorrelated output audio signal output by the second electroacoustic transducer comprise particularly good decorrelation characteristics due to the usage of the inventive multi channel audio signal processor. Furthermore, as the inventive audio conference system uses the inventive multi channel audio signal processor, the audio signals output by the first electroacoustic transducer and the second electroacoustic transducer contain no strong audible artifacts caused by the decorrelation process. Also, as in the inventive multi channel audio signal processor the phase shift is introduced in a frequency selective way, phase shifts (or a modulation amplitude of phase shifts) in the lower audio frequency range are smaller than phase shifts (or a modulation amplitude of phase shifts) in the higher audio frequency range. Thus, a stereo perception of the signal output by the first electroacoustic transducer and the second electroacoustic transducer is not audibly degraded despite of the decorrelation of the first decorrelated output audio signal and the second decorrelated output audio signal. Thus, a user perceiving the signal produced by the first electroacoustic transducer and the second electroacoustic transducer will not be affected severely by the phase shift introduced into the signals, as those are introduced in a way adapted to the human auditory perception. Moreover, the inventive audio conference system comprises a particularly simple structure, as it was recognized that the inventive multi channel signal processor can be realized with comparatively low effort when compared to other solutions providing comparable performance.

The present invention further comprises a method for deriving an output audio signal from an input audio signal. The method comprises extracting a first partial signal and a second partial signal from the input audio signal, the first partial signal being descriptive of an audio content in a first audio frequency range, the second partial signal being descriptive of an audio content in a second audio frequency range. The first audio frequency range comprises higher frequencies compared to the second audio frequency range. The method further comprises modifying the first partial signal, to obtain a first processed partial signal, and the second partial signal, to obtain a second process partial signal, so that a modulation amplitude of a time variant phase shift or time variant delay is applied to the first partial signal which is higher than a modulation amplitude of a time variant phase shift or a time variant delay applied to the second partial signal. The inventive method further comprises combining the first processed partial signal and the second processed partial signal.

Alternatively, the inventive method comprises modifying only the first partial signal, so that a time variant phase shift or a time variant delay is applied to the first partial signal. The method further comprises combining the first processed partial signal and the second partial signal to obtain the output audio signal. The inventive method comprises the same characteristics and advantages as the inventive apparatus.

Moreover, the present invention comprises a method for decorrelating a first channel audio signal and a second channel audio signal, to obtain two decorrelated output audio signals. The method comprises the deriving the first decorrelated signal from the first channel audio signal, such that audio contents in the first audio frequency range of the first decorrelated output audio signal and of the second channel audio signal (or signal derived from the second channel audio signal) comprise a larger time variant phase shift modulation with respect to each other than audio contents in the second audio frequency range of the first decorrelated output audio signal and the second channel audio signal (or a signal derived from the second channel audio signal), if the first channel audio signal and the second channel audio signal comprise a time-constant or a vanishing phase shift in the first audio frequency range and in the second audio frequency range.

Furthermore, the present invention comprises a computer program for executing the inventive methods, when the computer program runs on computer.

BRIEF DESCRIPTION OF THE DRAWINGS

Embodiments of the present invention will subsequently be described with reference to the enclosed Figures, in which.

DETAILED DESCRIPTION OF THE INVENTION

Figure 1:
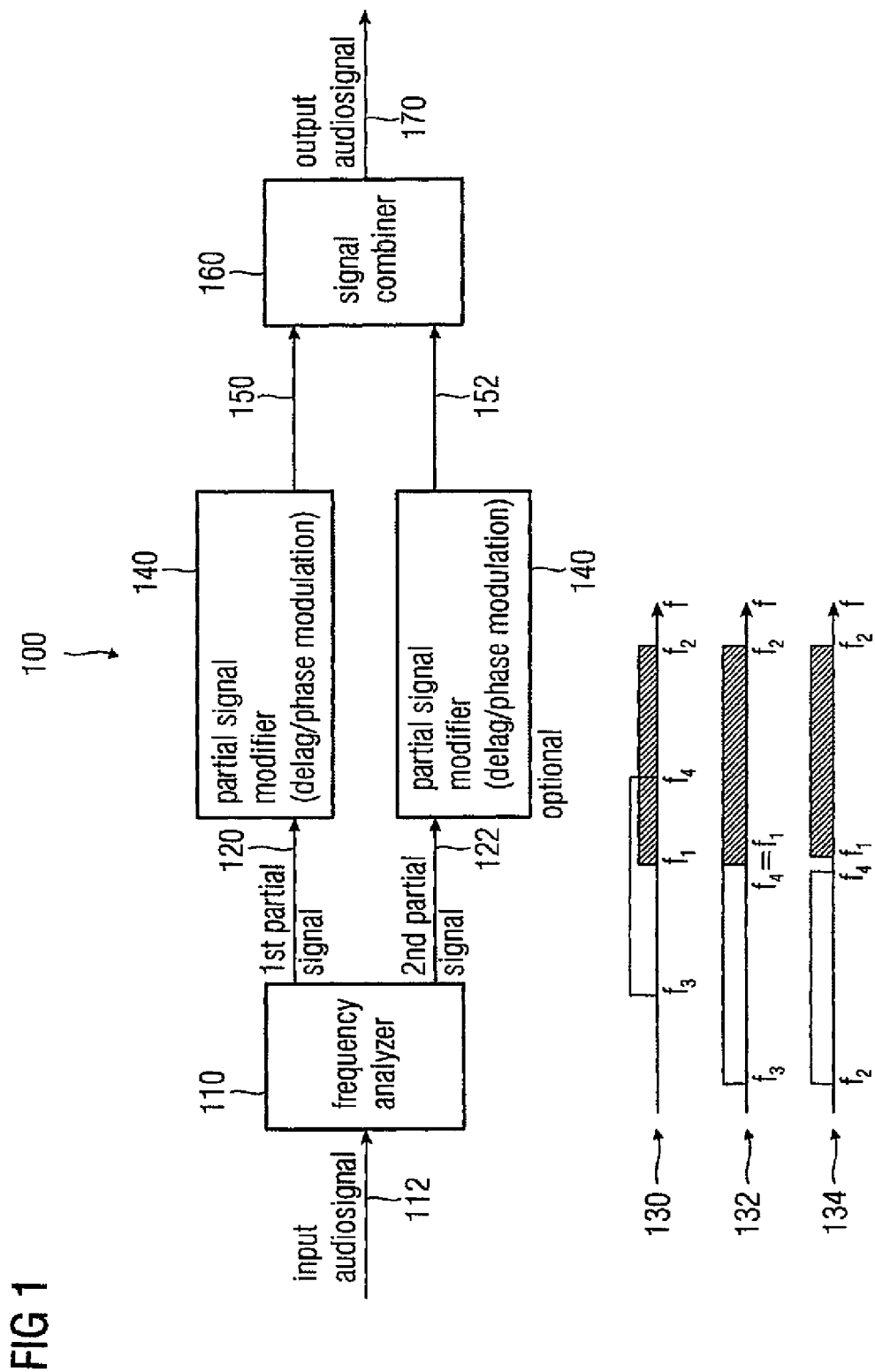
FIG. 1 shows a block schematic diagram of an inventive audio signal decorrelator, according to a first embodiment of the present invention.

FIG. 1 shows a block schematic diagram of an inventive audio signal decorrelator according to a first embodiment of the present invention. The audio signal decorrelator of FIG. 1 is designated in its entirety with 100. The audio signal decorrelator 100 comprises a frequency analyzer 110, which receives an input audio signal 112. The frequency analyzer 110 analyzes the input audio signal 112 and produces a first partial signal 120 and a second partial signal 122. The first partial signal 120 is descriptive of an audio content in a first audio frequency range, and the second partial signal 122 is descriptive of an audio content in a second audio frequency range.

The first audio frequency range comprises higher frequencies compared to the second audio frequency range. For example, the first audio frequency range and the second audio frequency range may be contiguous frequency ranges within the audio frequency range of about 10 Hz to 30 kHz.

For example, the first audio frequency range may cover audio frequencies between a first frequency $f_1$ and a second frequency $f_2$. The second audio frequency range may further cover audio frequencies between a third frequency $f_3$ and a fourth frequency $f_4$. Herein, $f_1$ designates a lower frequency border of the first audio frequency range, wherein the lower frequency border of the first frequency range is advantageously chosen to be larger than or equal to 1.1 kHz. Even more advantageously, the lower frequency border of the first frequency range is chosen to be larger than 2 kHz. In another embodiment, the lower frequency border of the first audio frequency range is larger than 4 kHz. In other words, the lower frequency border $f_1$ is typically chosen such that the first audio frequency range does not comprise the low frequency range below 1.1 kHz (or below 2 kHz), in which a human is particularly sensitive to phase shifts.

The first audio frequency range and the second audio frequency range may for example be overlapping. In this case, the first frequency $f_1$ is smaller than the second frequency $f_2$, and the third frequency $f_3$ is smaller than the fourth frequency $f_4$. Further, the third frequency $f_3$ is smaller than the first frequency $f_1$, and the fourth frequency $f_4$ lies between the first frequency $f_1$ and the second frequency $f_2$. The respective frequency range configuration is shown in a graphical representation designated with 130 in FIG. 1.

Alternatively, the first audio frequency range and the second audio frequency range may be adjacent audio frequency ranges. The first audio frequency range extends between the first frequency $f_1$ and the second frequency $f_2$, and the second audio frequency range extends between the third frequency $f_3$ and the fourth frequency $f_4$. In the case of adjacent audio frequency ranges, the first frequency $f_1$ is smaller than the second frequency $f_2$, and the third frequency $f_3$ is smaller than the fourth frequency $f_4$. Furthermore, the fourth frequency $f_4$ is identical to the first frequency $f_1$, as it is shown in the graphical representation 132 of FIG. 1.

Alternatively, the first audio frequency range and the second audio frequency range may be not adjacent, as shown in the graphical representation 134 of FIG. 1. For the case of non-adjacent audio frequency ranges, the frequency relationships are similar like for the case of adjacent audio frequency ranges, with the difference that the fourth frequency $f_4$ is smaller than the first frequency $f_1$.

The audio signal decorrelator 100 further comprises a partial signal modifier 140 for modifying the first partial signal 120, to obtain a first processed partial signal 150, and the second partial signal 122, to obtain a second processed partial signal 152, so that a modulation amplitude of a time variant phase shift or a time variant delay applied to the first partial signal 120 is higher than a modulation amplitude of a time variant phase shift or a time variant delay applied to the second partial signal 122. In other words, the partial signal modifier 140 is adapted to apply to the first partial signal 120 a larger time variant phase shift (or phase shift modulation) or time variant delay (or delay modulation) than to the second partial signal 122. Thus, frequencies of the first audio frequency range are affected stronger by a time variant phase shift (or phase shift modulation) or delay (or delay modulation) introduced in the partial signal modifier 140 when compared to frequencies of the second audio frequency range. The magnitude or modulation amplitude of the phase shift or delay applied to the different partial signals 120, 122 can be adjusted separately.

It should further be noted that the partial signal modifier 140 processes the first partial signal 120 and the second partial signal 122 separately or independently, so that signal values of the first partial signal 120 are isolated from (or have no impact on) signal values of the second processed partial signal 152, and so that signal values of the second partial signal 122 are isolated from (or have no impact on) signal values of the first processed partial signal 150 in the partial signal modifier 140. In other words, the partial signal modifier 140 is adapted to apply the time variant phase shifts (or the time variant phase shift modulation) or time variant delays (or delay modulation) on two different representations of the input audio signal, namely on the first partial signal 120 and on the second partial signal 122, independently.

The audio signal decorrelator 100 further comprises a signal combiner 160. The signal combiner 160 receives the first processed partial signal 150 and the second processed partial signal 152, and is adapted to combine the first processed partial signal 150 and the second processed partial signal 152 to form an output audio signal 170.

Thus, after a separate introduction of time variant phase shifts or time variant delays (or a time variant phase shift modulation, or a time variant delay modulation) into the first partial signal 120 and the second partial signal 122, the processed first partial signal 150 and the processed second partial signal 152 are reunited or combined to form the output audio signal 170.

In an alternative embodiment, the partial signal modifier is adapted to act only on the first partial signal 120, and is adapted not to introduce a time variant phase shift or time variant delay (or a time variant phase shift modulation, or a time variant delay modulation) into the second partial signal 122. In this case, the second processed partial signal 152 may be identical to the second partial signal 122, or may differ from the second partial signal 122 (merely) by a time invariant phase shift or a time invariant delay. In this case, the signal combiner 160 is typically adapted to combine the first processed partial signal 150 (which further comprises a time variant phase shift or time variant delay or time variant phase shift modulation or time variant delay modulation when compared to the first partial signal 120) either with the second partial signal 122, or with a signal derived from the second partial signal 122 without the introduction of a time variant phase shift or delay or phase shift modulation or delay modulation (e.g. by a time invariant delay or filtering operation).

Figure 2:
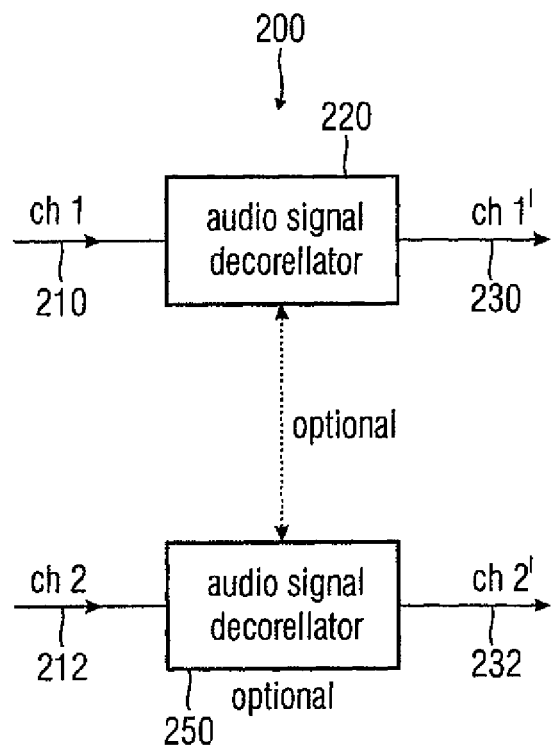
FIG. 2 shows a block schematic diagram of an inventive multi channel audio signal processor, according to a second embodiment of the present invention.

FIG. 2 shows a block schematic diagram of a multi channel audio signal processor according to a second embodiment of the present invention. The multi channel audio signal processor of FIG. 2 is designated in the entirety with 200. The audio signal processor 200 receives a multi channel audio signal, for example a two channel audio signal. For example, the multi channel audio signal processor 200 receives a first channel audio signal 210 and a second channel audio signal 212. The multi channel audio signal processor 200 further comprises a first audio signal decorrelator 220. The first audio signal decorrelator 220 is for example identical to the audio signal decorrelator 100 described with reference to FIG. 1.

The first audio signal decorrelator 220 provides at its output a first decorrelated output audio signal 230. The multi channel audio signal processor 200 further provides at an output a second decorrelated output audio signal 232, wherein the second decorrelated output audio signal 232 is either identical to the second channel audio signal 212, or derived from the second channel audio signal.

The multi channel signal processor 200 is further adapted such that audio contents in the first audio frequency range (as defined above) of the first decorrelated output audio signal 230 and of the second decorrelated output audio signal 232 comprise a larger modulation amplitude of a time variant phase shift (or time variant delay) with respect to each other than audio contents in the second audio frequency range (as defined above) of the first decorrelated output audio signal and of the second decorrelated output audio signal, if the first channel audio signal 210 and the second channel audio signal 212 comprise a time constant or vanishing phase shift (with respect to each other) in the first audio frequency range and in the second audio frequency range.

In other words, the multi channel audio signal processor is adapted such that a larger time variant phase shift or delay is introduced in the first audio frequency range than in the second audio frequency range. In other words, the modulation amplitude of the time variant phase shift introduced into the first audio frequency range is larger than the phase shift introduced into the second audio frequency range. This is reached by an appropriate set up of the first audio signal decorrelator 220 and optional further processing means within the multi channel signal processor 200.

Optionally, the multi channel audio signal processor 200 comprises a second audio signal decorrelator, which receives the second channel audio signal and outputs the second decorrelated output audio signal 232.

Optionally, the first audio signal decorrelator 220 and the second audio signal decorrelator 250 are coupled to a time synchronization, so that time variant phase shifts or time variant delays introduced into the first channel audio signal 210 and into the second channel audio signal 212 are time coordinated.

Figure 3:
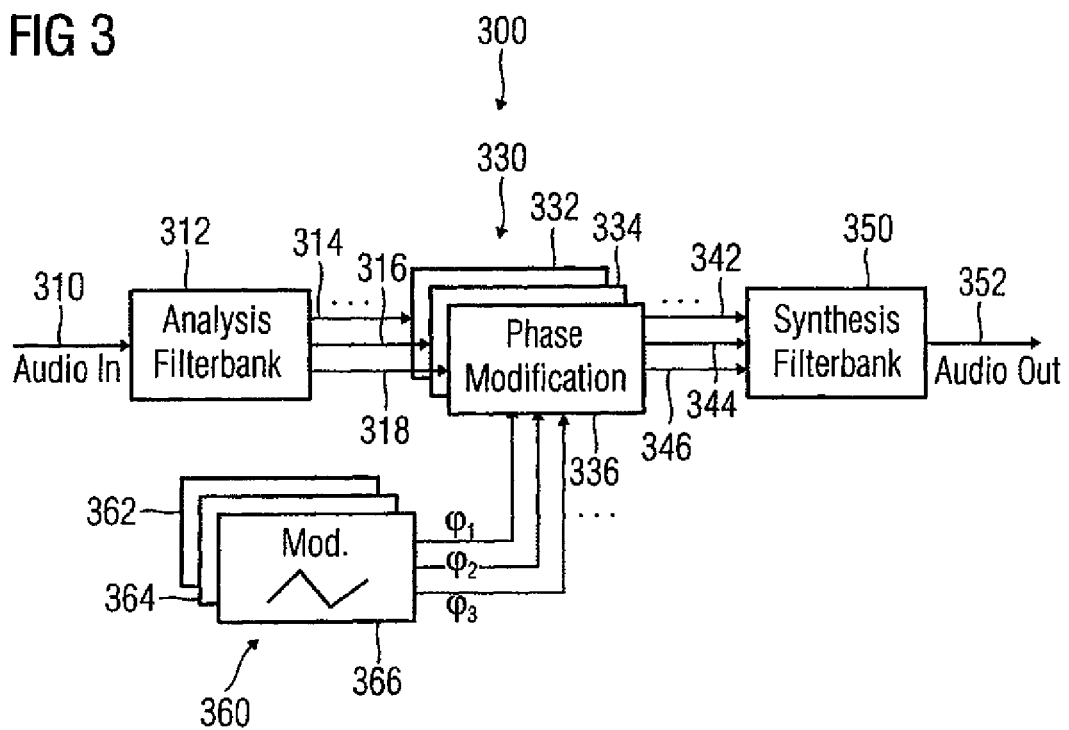
FIG. 3 shows a block schematic diagram of an inventive audio signal decorrelator, according to a third embodiment of the present invention.

FIG. 3 shows a block schematic diagram of an inventive audio signal decorrelator, according to a third embodiment of the present invention. The audio signal decorrelator of FIG. 3 is designated in a entirety with 300. Audio signal decorrelator 300 receives an input audio signal 310. An analysis filterbank 312 receives the input audio signal 310 and provides at least two (advantageously: more than two) partial signals 314, 316, 318. The partial signals 314, 316, 318 describe audio contents of the input audio signal 310 in different audio frequency ranges, wherein the audio frequency ranges may be overlapping, adjacent or separate, as described with reference to FIG. 1. The analysis filterbank 312 splits up the audio signal 310 in a plurality of partial signals covering different (but possibly overlapping) audio frequency ranges. The partial signals 314, 316, 318 may for example comprise bandpass time signals extracted from different audio frequency ranges of the input audio signal 310. Alternatively, the partial signals 314, 316, 318 may also comprise spectral coefficients or series of spectral coefficients describing a spectral composition of the input audio signal 310.

For example, the analysis filterbank 312 may be adapted to provide partial signals 314, 316, 318, wherein a single partial signal is based on a transformation (e.g. a discrete Fourier Transformation) of the input audio signal in a given audio frequency range. The different partial signals thus comprise the respective information for different frequency ranges. Also, the analysis filterbank 312 may be adapted to split the input audio signal 310 into time segments (or time frames, or time slots), and to provide sets of spectral coefficients for a plurality of time segments (one set of spectral coefficients corresponding to one time segment). In this case, the partial signals 314, 316, 318 each comprise a sequence of spectral coefficients for subsequent time intervals or time segments.

In other words, the first partial signal 312 may comprise a sequence of a first spectral coefficients for a first frequency range, a first spectral coefficient for a first time interval, a second spectral coefficient for the first frequency range and for a second time interval, and a third spectral coefficient for the first frequency range and for a third time interval. Analogously, the second partial signal 316 may comprise a sequence of a first spectral coefficient for the second audio frequency range in the first time interval, a second spectral coefficient for the second audio frequency range in the second time interval, and a third spectral coefficient for the second audio frequency range in the third time interval.

The audio signal decorrelator 300 further comprises a phase modification unit 330 adapted to receive the partial signals 314, 316, 318. The phase modification unit 330 comprises three individual partial signal modifiers 332, 334, 336. The first partial signal modifier 332 receives the first partial signal 314 and a first phase shift value $\phi_1$. The first partial signal modifier is adapted to generate a first processed partial signal 342 by applying a time variant phase shift (or time variant delay) to the first partial signal, a magnitude of the phase shift being defined by the first phase shift value $\phi_1$. The second partial signal modifier 334 generates a second processed partial signal 344 by applying a time variant phase shift (or time variant delay) described by a second phase shift value $\phi_2$ to the second partial signal 316. The third partial signal modifier 336 generates a third processed partial signal 346 by applying a time variant phase shift (or time variant delay) described by the third phase shift signal $\phi_3$ to the third partial signal 318. Thus, the first partial signal modifier 332, the second partial signal modifier 334 and the third partial signal modifier 336 are adapted to independently process the first partial signal 314, the second partial signal 316 and the third partial signal 318, to obtain the first processed partial signal 342, the second processed partial signal 344 and the third processed partial signal 346.

The audio signal decorrelator 300 further comprises a synthesis filterbank 350 for combining the first processed partial signal 342, the second processed partial signal 344 and the third processed partial signal 346 into a single output audio signal 352. For example, the synthesis filterbank is adapted to obtain the output audio signal 352 by a linear combination of the first processed partial signal 342, the second processed partial signal 344 and the third processed partial signal 346, provided the processed partial signals are time signals. However, if the processed partial signals are for example sequences of spectral coefficients, the synthesis filterbank 350 is adapted to synthesize the output audio signal 352 as a time signal on the basis of the sequences of spectral coefficients (for example by applying an inverse time discrete Fourier Transform).

Audio signal decorrelator 300 further comprises a modulation function generator 360. In the shown embodiment, modulation function generator 360 generates three modulation functions (also designated as modulation time functions), which take time-varying values. The first modulation time function 362 provides (or represents, or determines) the first phase shift value $\phi_1$, the second modulation time function provides (or represents, or determines) the second phase shift value $\phi_2$, and the third modulation time function provides (or represents, or determines) a third phase shift value $\phi_3$. The modulation time functions 362, 364, 366 may be independent from each other, or may be synchronized. Advantageously, a phase shift modulation amplitude or a delay modulation amplitude introduced into the first partial signal 314 is larger than a phase shift modulation amplitude or a delay modulation amplitude introduced into the second partial signal 316. Further, advantageously a phase shift modulation amplitude or a delay modulation amplitude introduced into the second partial signal 316 is larger than a phase shift modulation amplitude or a delay modulation amplitude introduced into the third partial signal 318.

In an embodiment, the three modulation time functions 362, 364, 366 are proportional with respect to other, and are all derived from a single modulation function by means of a scaling.

Figure 4:
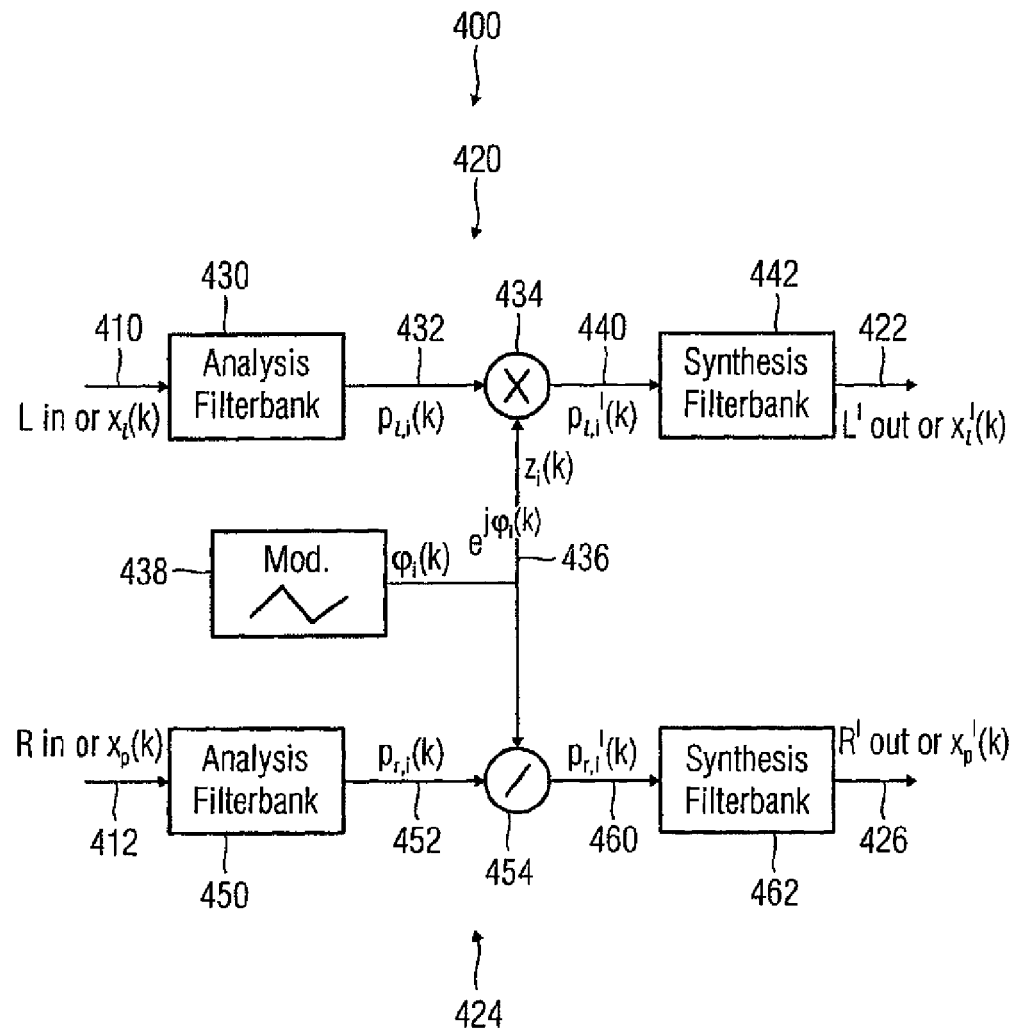
FIG. 4 shows a block schematic diagram of an inventive multi channel audio signal processor, according to a fourth embodiment of the present invention.

FIG. 4 shows a block schematic diagram of a multi-channel audio signal processor according to a fourth embodiment of the present invention. The multi-channel audio signal processor of FIG. 4 is designated in its entirety with 400. The multi-channel audio signal processor 400 receives a first channel audio signal 410 and a second channel audio signal 412. For example, the first channel audio signal represents the left channel of a stereo audio signal, and the second channel audio signal represents the right channel of a stereo audio signal. The multi-channel audio signal processor comprises a first branch 420 for processing the first channel audio signal, to provide a first decorrelated output audio signal 420 on the basis of the first channel (input) audio signal 410, and a second branch 424 for providing a second decorrelated output audio signal 426 on the basis of the second channel (input) audio signal 412. The first branch 420 comprises a first analysis filterbank 430 similar to the analysis filterbank described with respect to FIG. 3. The first analysis filterbank 430 receives the first channel input audio signal 410 and produces a first partial signal 432 on the basis of the first channel input audio signal 410. It should be noted here that in FIG. 4 only one output signal of the analysis filterbank 430 is shown for sake of simplification. However, it should be noted that the analysis filterbank 430 may output a plurality of two, or more than two, partial signals.

The first partial signal 432 comprises a sequence of spectral coefficients, which are complex-valued. The first partial signal 432 is multiplied in a multiplier 434 with complex-valued phase shift values (or a time sequence of complex-valued phase shift values) 436, of magnitude 1, produced by a modulation function generator 438. The result of the multiplication, i.e. the output signal of the multiplier 434, forms a processed partial signal 440, which is input into a synthesis filterbank 442. The processed partial signal 440 is typically a time sequence of spectral coefficients.

It should be noted that the synthesis filterbank 442 typically receives a plurality of two or more than two, processed or unprocessed partial signals. Thus, the synthesis filterbank 442 is adapted to combine the processed partial signal 440 with additional processed or unprocessed partial signals not shown in FIG. 4 to form the first decorrelated output audio signal 422.

The second branch 424 comprises a second analysis filterbank 450. The second analysis filterbank receives as an input signal the second channel input audio signal 412. On the basis thereof, the second analysis filterbank 450 generates a second partial signal 452. Similar to the first analysis filterbank 430, the second analysis filterbank 450 may produce further partial signals not shown in FIG. 4 for the sake of simplicity. A divider 454 receives the second partial signal 452 and the complex-valued phase shift value 436. The divider 454 is adapted to divide the second partial signal 452 by the phase shift value 436 to generate a second processed partial signal 460. A second synthesis filterbank 462 receives the second processed partial signal 460, and combines the second processed partial signal 460 with additional processed or unprocessed partial signals to generate the second decorrelated output audio signal 426. The functionality of the second synthesis filterbank 462 is comparable to the functionality of the first synthesis filterbank 442.

Furthermore, it should be noted that the first analysis filterbank 430 and the second analysis filterbank 450 are identical. Also, in an embodiment, the first synthesis filterbank 442 and the second synthesis filterbank 462 have identical structures and parameters.

In the following, the functionality of the multi-channel audio signal processor 400 of FIG. 4 will be described. Firstly, it should be noted that if the first channel input audio signal 410 and the second channel input audio signal 412 are decorrelated, the first decorrelated output audio signal 422 and the second decorrelated output audio signal 426 are automatically decorrelated.

However, in the following, the case will be analyzed that the first channel input audio signal and the second channel input audio signal 410, 412 are identical. It is assumed that the analysis filterbanks 430, 450 are identical, such that the first partial signal 432 and the second partial signal 452 are also identical, provided that the first partial signal 432 and the second partial signal 452 describe audio contents in the same audio frequency range. It is further assumed that the first partial signal 432 and the second partial signal 452 are represented as a series of spectral coefficients for the audio frequency range under consideration (e.g. the first audio frequency range), wherein it is assumed that the analysis filterbanks 430, 450 analyze the first channel input audio signal 410 and the second channel input audio signal 412 in discrete (and/or possibly overlapping) time intervals. The audio signal contents in the first frequency range in each time interval are described by corresponding spectral coefficients. In other words, the multiplier 434 and the divider 452 each receive a time-discrete sequence of spectral coefficients, namely a first sequence of spectral coefficients forming the first partial signal 432, and a second sequence of spectral coefficients forming the second partial signal 452.

Further, with the above assumptions, the first sequence of spectral coefficients is identical to the second sequence of spectral coefficients. The multiplier 434 also receives a complex value $z_1$ (or a time series of time varying complex values 436), the complex value $z_1$ being derived from a phase shift value $\phi$ according to the equation:

$$z_1 = e^{j\phi}.$$

In the above equation, e designates the complex exponential function, and j designates the imaginary unit, i.e. the square root of −1.

In other words, the (complex-valued) multiplier 434 is adapted to multiply the spectral coefficients with the complex value $z_1$ of magnitude one. Consequently, the phase of the respective spectral coefficient is changed in a counter-clockwise direction by the angle $\phi$.

In contrast, the complex-valued divider 452 receives the spectral coefficients and divides them by the value $z_1$ (or by a time series of complex values 436). In this way, the phase of the respective spectral coefficient is turned in a clockwise direction by the angle $\phi$.

In other words, the processed partial signal 440 is a series of complex-valued spectral coefficients, with phases turned in a counter-clockwise direction with respect to values of the first partial signal 432. In contrast, the phase of the values of the second processed partial signal 460 is turned in a clockwise direction by the angle $\phi$ when compared to the values of the second partial signal 452. In other words, for a given time interval, the phase of a spectral coefficient in the first partial signal 432 is turned in the opposite direction when compared to a corresponding spectral coefficient in the second partial signal. The absolute of the phase rotation is identical for spectral coefficients in the first partial signal and in the second partial signal, for the given time interval.

In the following, the relevant relations will be described in terms of equations. In the following description, $p_{l,i}(k)$ designates a partial value (e.g. a spectral coefficient) for the first channel or the left channel (the left channel being designated by the fixed index l) for the i-th audio frequency range in a temporal position designated by index k. $p_{r,i}(k)$ designates a partial value (e.g. a spectral coefficient) for the second channel or the right channel (as indicated by the fixed index r) for the i-th frequency range in the temporal position designated by index k. $\phi_i(k)$ designates the phase shift value at the temporal positions designated by the index k, for the audio frequency range designated by index i. $z_i(k)$ describes a complex value of magnitude 1 having the phase $\phi_i(k)$.

In view of the above definition, the following equations hold:

$$p_{l,i}'(k) = p_{l,i}(k) \cdot \exp(j\phi_i(k)); \text{ and}$$

$$p_{r,i}'(k) = p_{r,i}(k) \cdot \exp(-j\phi_i(k)).$$

$p_{l,i}'(k)$ is a processed spectral coefficient of the first processed partial signal 440 for the first channel (left channel) and the i-th audio frequency range at the temporal position designated with index k. $p_{r,i}'(k)$ is a processed spectral coefficient of the second processed partial signal 460 for the second channel (right channel) and the i-th audio frequency range in a temporal position designated by the temporal index k.

The index i covers any audio frequency ranges to be processed, and is smaller than or equal to the number of frequency ranges used by the analysis filterbanks 430, 450 and the synthesis filterbanks 442, 462 (wherein i>=1 holds).

It should further be noted that $\phi_i(k)$ is a time variant phase shift parameter generated by the modulation function generator 438 for each audio frequency range i to be processed.

It should further be noted that the analysis filterbanks 430 are for example adapted to provide a set of I partial signal values $p_{l,i}(k)$, $p_{r,i}(k)$, i=1, ..., I for each time interval with index k. In other words, the analysis filterbanks 430, 450 are adapted to transform a time interval of the first channel input audio signal 410 (or the second channel input audio signal 412) into a set of I spectral coefficients, the spectral coefficients describing the audio content of the first channel input audio signal 410 (or the second channel input audio signal 412) for I different, overlapping or non-overlapping, audio frequency ranges.

Analogously, the synthesis filterbanks 442, 462 are adapted to produce the first decorrelated output audio signal 422 (or the second decorrelated output audio signal 426) at least in a certain time interval on the basis of corresponding processed spectral coefficients $p_{l,i}'(k)$ (or $p_{r,i}'(k)$), i=1, ..., I. However, the synthesis filterbanks may have an infinite or non-causal response, if necessitated.

In other words, a synthesis filterbank 442, 462 is a device receiving a plurality of I spectral coefficients for a given time interval, and producing therefrom a time domain signal (i.e. the first decorrelated audio output signal 422 or the second decorrelated audio output signal 426).

Figure 5:
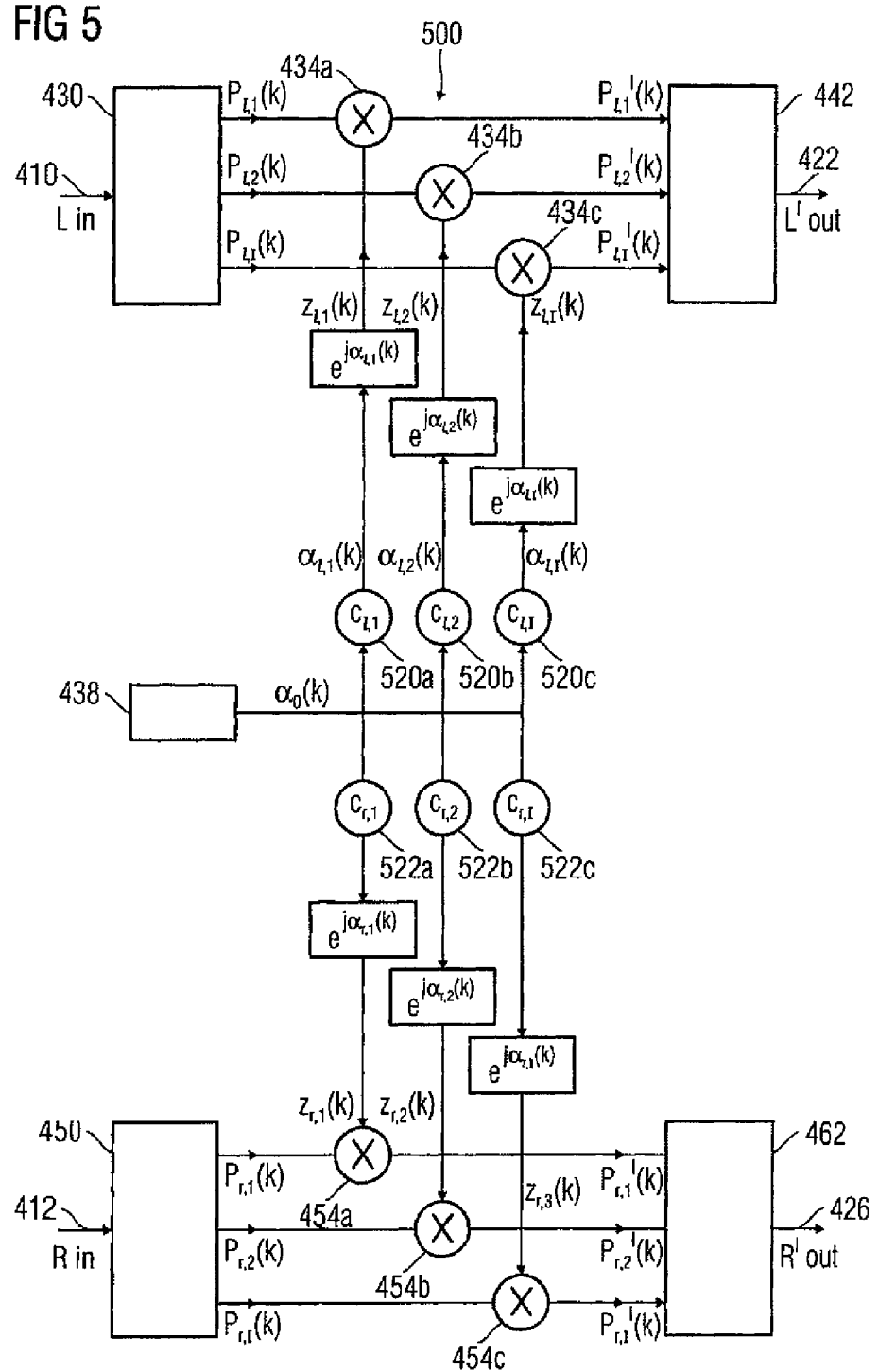
FIG. 5 shows a block schematic diagram of an inventive multi channel audio signal processor, according to a fifth embodiment of the present invention.

FIG. 5 shows another block schematic diagram of an inventive multi-channel audio signal processor according to a fifth embodiment of the present invention. The audio signal processor of FIG. 5 is designated in its entirety with 500. As the multi-channel audio signal processor 500 of FIG. 5 is similar to the multi-channel audio signal processor 400 of FIG. 4, same means and signals are designated with same reference numerals in FIGS. 4 and 5. Further, if a single unit shown in FIG. 4 is replaced by multiple equivalent units in FIG. 5, letters (a, b, c ... ) are added to the reference numerals in order to distinguish the different instances of the same component.

It should be noted that for the first channel, the first spectral coefficient $p_{l,1}(k)$ is multiplied with a first phase shift value $z_{l,1}(k)$ in a corresponding multiplier 434a to form processed spectral coefficient $p_{l,1}'(k)$. A second spectral coefficient $p_{l,2}(k)$ is multiplied with a second phase shift value $z_{l,2}(k)$ in a second multiplier 434b to obtain the second processed spectral coefficient $p_{l,2}'(k)$. The I-th spectral coefficient $p_{l,I}(k)$ is multiplied in a third multiplier 434c with a third phase shift value $z_{l,I}(k)$ to obtain the I-th processed spectral coefficient $p_{l,I}'(k)$.

Furthermore, analog operations are performed for the second channel audio input signal 412 to form the second decorrelated output audio signal 426. In equations:

$$p_{l,i}'(k)=p_{l,i}(k)\cdot z_{l,i}(k), i=1,\ldots,I$$

$$p_{r,i}'(k)=p_{r,i}(k)\cdot z_{r,i}(k), i=1,\ldots,I$$

$$z_{l,i}(k)=e^{j\alpha_{l,i}(k)}, i=1,\ldots,I$$

$$z_{r,i}'(k)=e^{j\alpha_{r,i}(k)}, i=1,\ldots,I$$

$$\alpha_{l,i}(k)=\alpha_0(k)\cdot c_{l,i}, i=1,\ldots,I$$

$$\alpha_{r,i}(k)=\alpha_0(k)\cdot c_{r,i}, i=1,\ldots,I$$

In other words, all the phase shift values $z_{l,i}(k)$, $z_{r,i}(k)$ are derived from a single time-dependent angle value $\alpha_0$ provided by a modulation (time-) function generator. The angle value $\alpha_0$ determines the phase shift angle, and is applied to the different partial signals (for different audio frequency ranges) both of the left channel 410 and the right channel 412. However, in accordance with an embodiment, the phase shift magnitude parameters $c_{l,i}$, $c_{r,i}$ for the frequency bands (or audio frequency ranges) i are chosen such that a magnitude of a phase shift applied to a given first audio frequency range having higher frequencies than a given second audio frequency range is larger than or equal to a phase shift introduced into the given second audio frequency range. In other words, in an embodiment, the following equations hold:

$$|c_{l,k}|\geq|c_{l,k+1}|, k=1,\ldots,I-1$$

$$|c_{r,k}|\geq|c_{r,k+1}|, k=1,\ldots,I-1.$$

In the above equations, it is assumed that an audio frequency range corresponding to a partial signal with frequency index i=k comprises higher frequencies than an audio frequency range corresponding to a partial signal with frequency index i=k+1.

In an embodiment, processed spectral coefficients $p_{l,j}'(k)$, $p_{r,j}'(k)$ corresponding to a given audio frequency range j comprise a larger time-varying phase shift with respect to each other when compared to a time-varying phase shift between spectral coefficients $p_{l,m}'(k)$, $p_{r,m}'(k)$ corresponding to a given audio frequency range m, wherein the given audio frequency range j comprises higher frequencies than the given audio frequency range m.

In equations:

$$|c_{l,k}-c_{r,k}|\geq|c_{l,k+1}-c_{r,k+1}|, k=1,\ldots,I-1$$

In an embodiment, the phase shift or delay introduced into a given audio frequency range comprises identical magnitude and opposite direction in the processing of the first channel audio signal and the processing of the second channel audio signal. With respect to FIG. 5, the spectral coefficient $p_{l,i}$, describing an audio content of the i-th audio frequency range of the first channel audio input signal 410, is multiplied by a value which is complex conjugate to a value with which the spectral coefficient $p_{r,i}(k)$, describing an audio content of the same audio frequency range i of the second channel input audio signal 412, is multiplied.

In an equation:

$$c_{l,i}=-c_{r,i}, i=1,\ldots,I.$$

Furthermore, it should be noted here that it is assumed that the constant $c_{l,i}$, $c_{r,i}$ are real values.

It should further be noted that the phase shift values $z_{l,i}(k)$, $z_{r,i}(k)$ can be generated in different ways. Also, simplifications can be applied, for example in order to generate complex conjugate values. Furthermore, a multiplication with a complex value of magnitude 1 can be replaced by division by the complex conjugate thereof, as is known from math.

Figure 6:
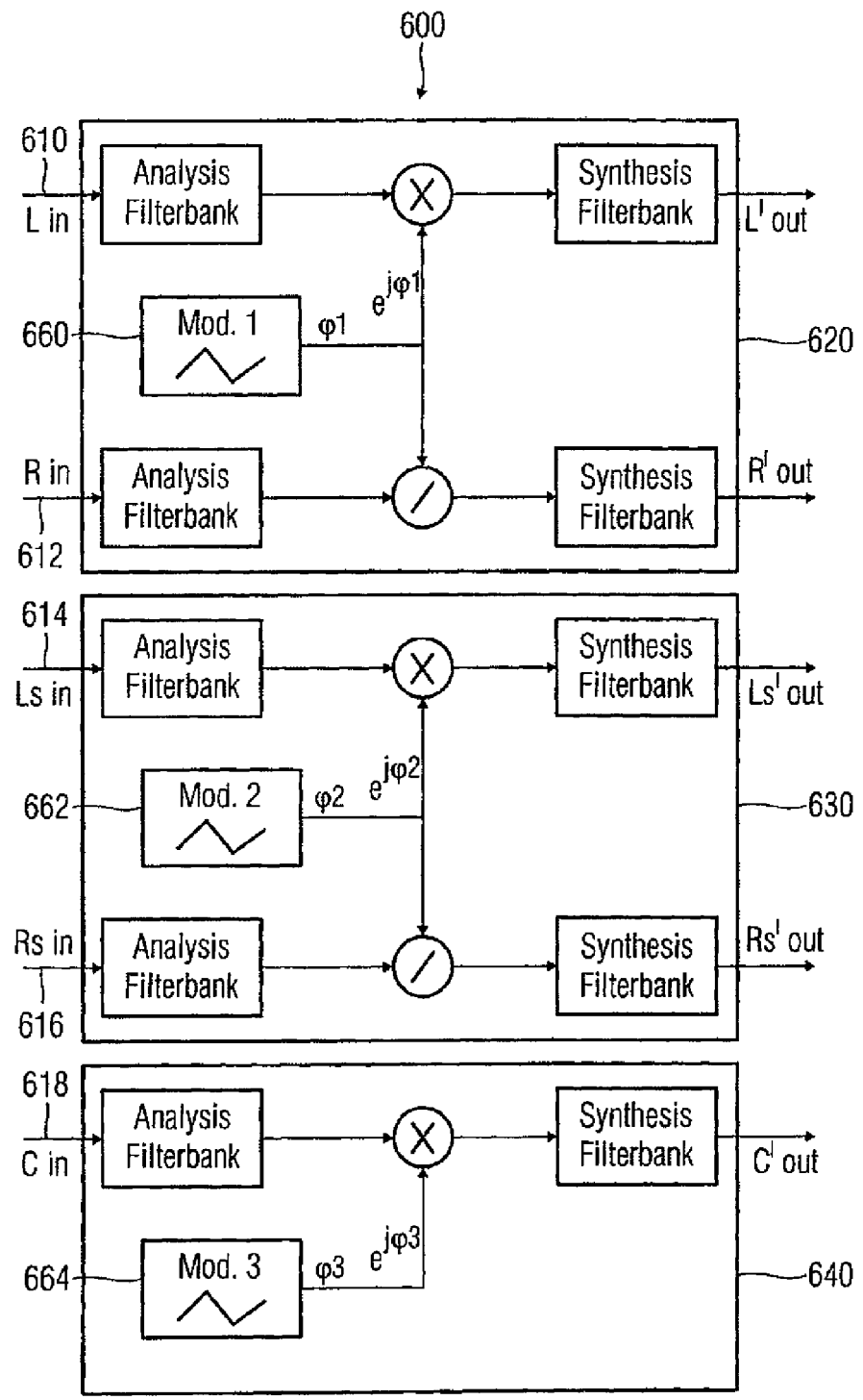
FIG. 6 shows a block schematic diagram of an inventive five channel audio signal processor, according to a sixth embodiment of the present invention.

FIG. 6 shows a block schematic diagram of an inventive five-channel audio signal processor. The five-channel audio signal processor of FIG. 6 is designated in its entirety with 600. The five-channel audio signal processor 600 receives a first channel input audio signal 610, a second channel input audio signal 612, a third channel input audio signal 614, a fourth channel input audio signal 616 and a fifth channel input audio signal 618. The five-channel audio signal processor 600 comprises a first two-channel audio signal processor 620, whose structure is identical to the structure of the audio signal processors 200, 400, 500 of FIGS. 2, 4 and 5. Furthermore, the five-channel audio signal processor 600 comprises a second two-channel audio signal processor 630, whose structure is identical to the structure of the two-channel audio signal processors 200, 400, 500 of FIGS. 2, 4 and 5. Furthermore, the five-channel audio signal processor 600 comprises an audio signal decorrelator 640, whose structure is identical to the structure of the audio signal decorrelators 100, 300 of FIGS. 1 and 3.

The first two-channel audio signal processor 620 receives the first channel input audio signal 610 and the second channel input audio signal 612. The first channel input audio signal 610 is in an embodiment identical to the left front channel (or left front speaker) audio signal of a five-channel Dolby Surround audio signal. The second channel audio signal 612 is in an embodiment identical to a right front channel (or right front speaker) audio signal of a five-channel Dolby Surround audio signal. The second two-channel audio signal processor 630 receives as its input signals the third channel input audio signal 614 and the fourth channel input audio signal 616. The third channel input audio signal 614 is in an embodiment identical to the left rear channel (or left rear speaker) audio signal of a five-channel Dolby Surround audio signal, and the fourth channel audio signal 616 is in an embodiment identical to the right rear channel (or right rear speaker) audio signal of a five-channel Dolby Surround audio signal. The audio signal decorrelator 640 receives as its input signal the fifth channel audio input signal 618, which is in an embodiment identical to a center channel (or center speaker) signal of a five-channel Dolby Surround audio signal.

In an embodiment, the first decorrelated output audio signal of the first two-channel audio signal processor 620 serves as the left front speaker audio signal in a Dolby Surround system. The second decorrelated output audio signal of the first two-channel audio signal processor 620 serves as the right front speaker audio signal in the embodiment. The first decorrelated output audio signal of the second two-channel audio signal processor 630 serves as a left rear speaker audio signal in an embodiment. The second decorrelated output audio signal of the second two-channel audio signal processor serves as a right rear speaker audio signal in an embodiment. The decorrelated audio output signal of the audio signal decorrelator serves as a center speaker audio signal in an embodiment.

Although the structure of the two-channel audio signal processors 620, 630 is identical, the audio signal processors 620, 630 are operated with different parameters in order to obtain a sufficient overall decorrelation. It was described that in the multi-channel audio signal processor 500 of FIG. 5 the phase shift applied to all partial signals is derived from a single time-varying modulation function, namely from the time-varying angle $\alpha_0(k)$, (wherein k is a time-discrete or time-continuous time parameter). Typically, the time-varying modulation function $\alpha_0(k)$ is a repetitive time function having a repetition frequency f. However, in the two-channel audio signal processors 620, 630, correlation function generators 660, 662 having different frequencies are applied. In other words, in the first two-channel audio signal processor 620, the phase shift introduced into the partial signals is periodic with a frequency $f_{per,1}$. In the second two-channel audio signal processor, the phase shift introduced into the partial signals is periodic with a second frequency $f_{per,2}$. Furthermore, the first frequency $f_{per,1}$ is different from the second frequency $f_{per,2}$. Furthermore, in the audio signal decorrelator 640, the phase shift introduced into the partial signals is periodic with a third frequency $f_{per,3}$. The frequency $f_{per,3}$ is different from the first frequency $f_{per,1}$ and from the second frequency $f_{per,2}$. Alternatively or additionally, shapes (or waveforms) of the temporal function of the phase shift introduced into the partial signals in the first two-channel audio signal processor 620, the second audio signal processor 640 and the audio signal decorrelator 630 may be different. For example, the modulation signal generator 660 may produce a sinusoidal waveform, wherein the values of the sinusoidal waveform at different instances of time determine the phase shift introduced into the partial signals at the corresponding instances of time. In contrast, the modulation signal generator 662 may produce a triangular waveform. It should be noted that the five-channel audio signal processor of FIG. 6 may be extended by adding further channels. For example, a seven-channel audio signal processor can be created by adding another pair of channels, the additional pair of channels being processed for example by an additional two channel audio signal processor.

Figure 7:
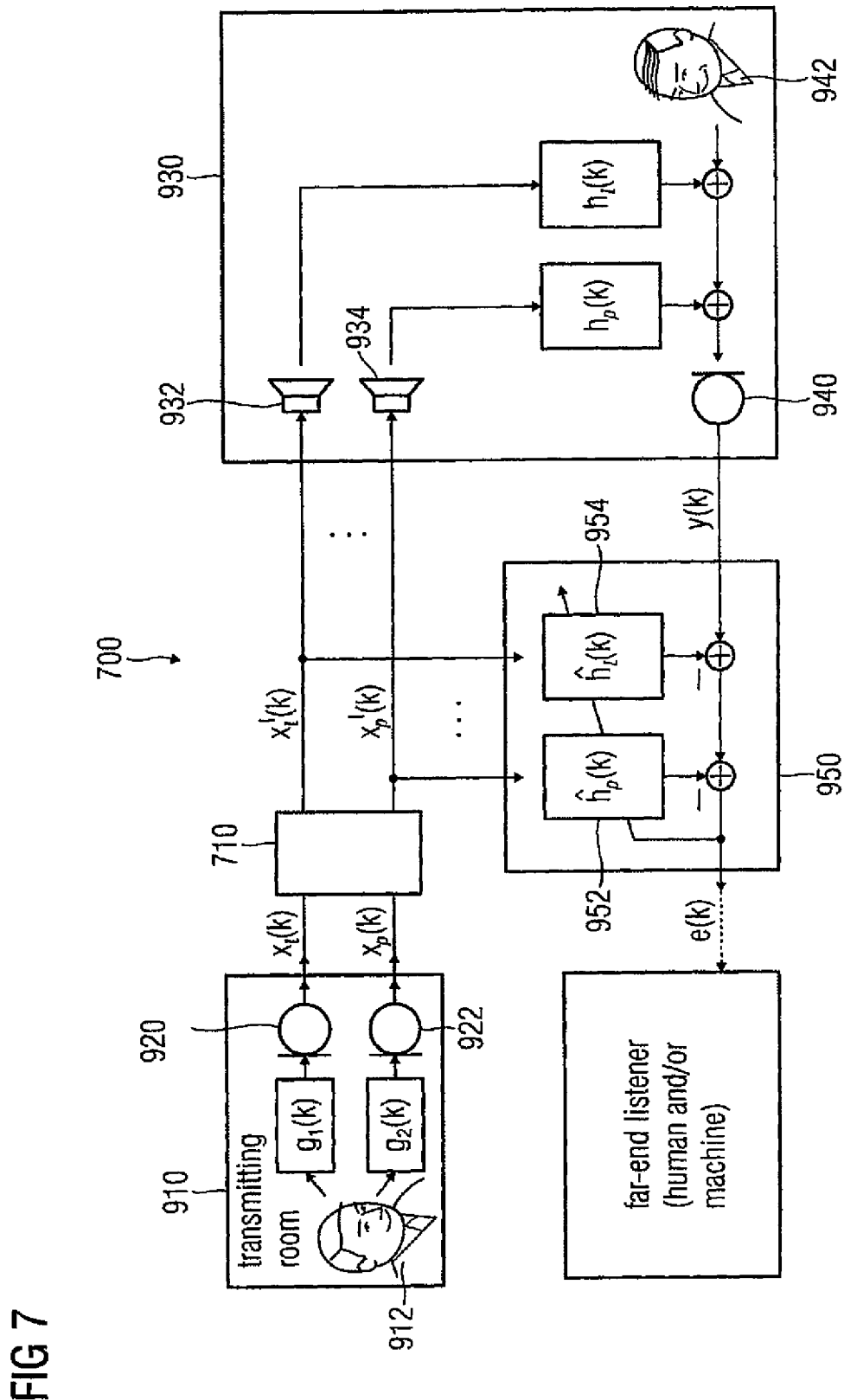
FIG. 7 shows a block schematic diagram of an inventive audio conference system, according to a seventh embodiment of the present invention.
Figure 9:
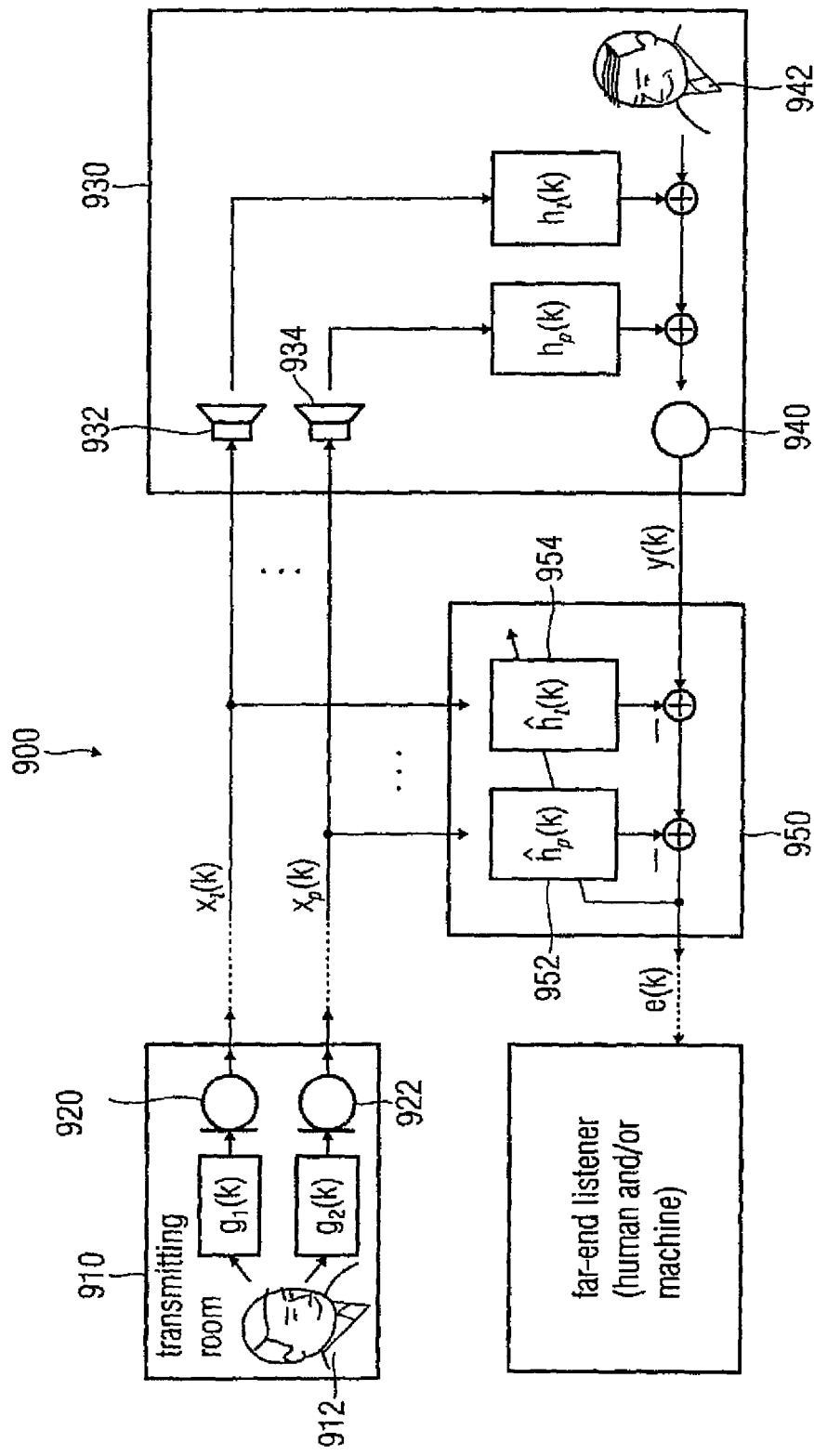
FIG. 9 shows a block schematic diagram of a known audio conference system.
Figure 10:
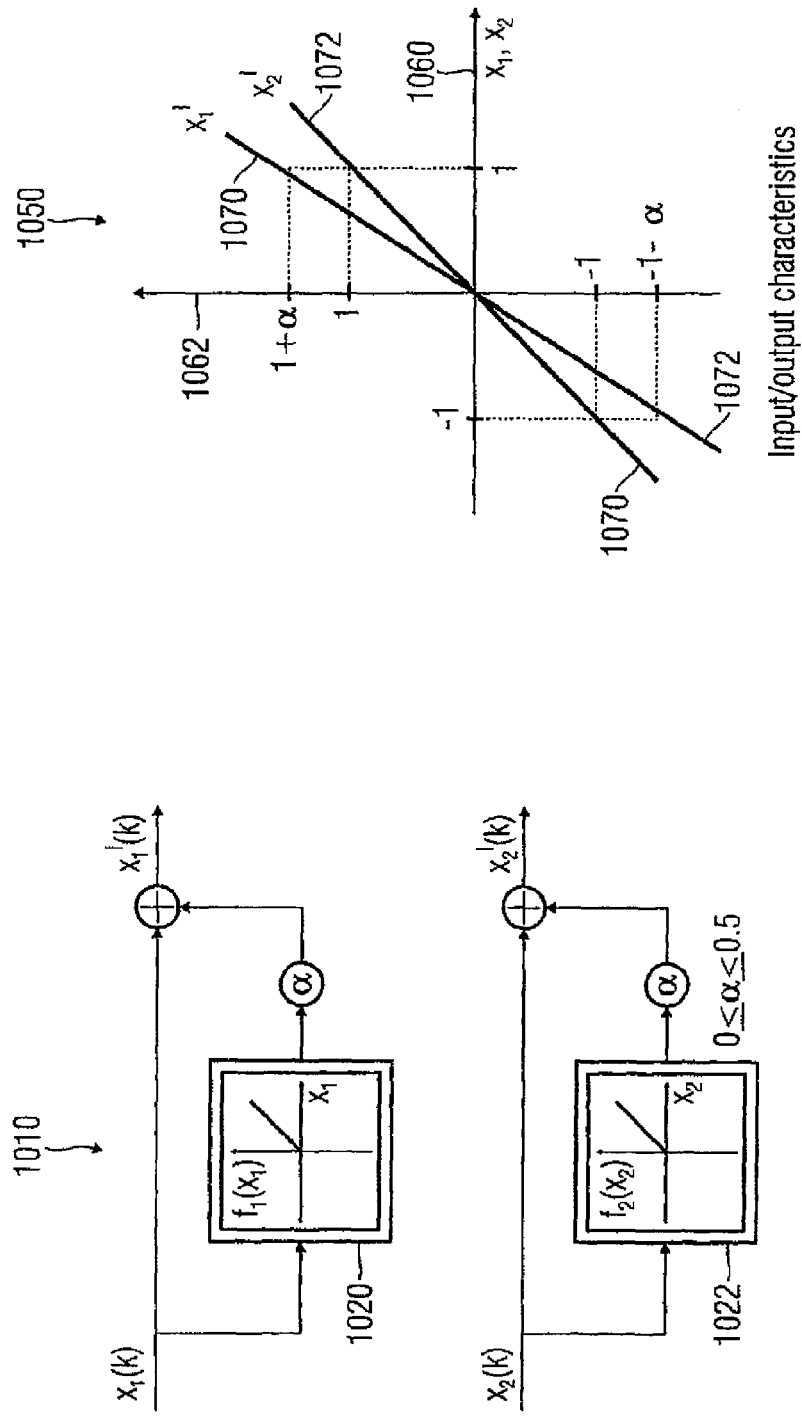
FIG. 10 shows a graphical representation of a preprocessing method using a non-linearity.

FIG. 7 shows a block schematic diagram of the inventive audio conference system. The audio conference system of FIG. 7 is designated in its entirety with 700. It should be noted here that those features already described with respect to the known audio conference system 900 of FIG. 9 are designated with same reference numerals in FIG. 7, and will not be explained here again. When compared to the audio conference system 900 of FIG. 9, the audio conference system 700 additionally comprises a two-channel audio signal processor 710. The audio signal processor 710 is identical to the audio signal processor 200, 400, 500 of FIGS. 2, 4 and 5, and receives as a first input signal the first microphone signal $x_l(k)$ and as a second input signal the second microphone signal $x_p(k)$. The first input of the two-channel audio signal processor 710 is for example identical to the first channel audio signal input 410 of the audio signal processor 400 of FIG. 4, and the second audio signal input of the two-channel audio signal processor 710 is for example identical to the second channel audio signal input 412 of the audio signal processor 400. The audio signal processor 710 outputs as a first output audio signal (or as the first decorellated output audio signal) a signal $x_l'(k)$. The two-channel audio signal processor 710 further outputs as a second output audio signal (or as the second decorellated output audio signal) a signal $x_p'(k)$. The first audio signal output of the two-channel audio signal processor 710 is for example identical to the first decorrelated audio signal output 422 of the audio signal processor 400, and the second audio signal output of the two-channel audio signal processor 710 is for example identical to the second decorrelated audio signal output 426 of the audio signal processor 400.

Furthermore, the audio signal $x_l'(k)$, which is decorrelated from the audio signal $x_l(k)$, is output by the speaker 932, and is further fed into the channel estimator 954. Furthermore, the audio signal $x_p'(k)$, which is decorrelated from the audio signal $x_p(k)$, is output by the second speaker 934, and is further fed into the channel estimator 952.

Due to the function of the audio signal processor 710, the audio signals $x_l'(k)$, $x_p'(k)$ are decorrelated even if the microphone signals $x_l(k)$, $x_p(k)$ are strongly correlated or identical. For this reason, the channel estimator 952, 954 can estimate the individual channel transfer functions $h_p(k)$, $h_l(k)$ between the speakers 932, 934 and the microphone 940 individually, even if the microphone signals $x_l(k)$, $x_p(k)$ are identical. Thus, as soon as the channel estimators 952, 954 have converged, both channel transfer functions $h_p(k)$, $h_l(k)$ are estimated with sufficient accuracy, independent of the microphone signals $x_l(k)$, $x_p(k)$.

Furthermore, optionally the audio conference system 700 may have a correlation detector determining whether the microphone signals $x_l(k)$, $x_p(k)$ are correlated. If the correlation between the two microphone signals exceeds a predetermined threshold, the correlation detector may activate the audio signal processor 710, while the audio signal processor 710 is deactivated as long as the correlation between the microphone signals $x_l(k)$, $x_p(k)$ is below the predetermined threshold. Therefore, optimal, unprocessed audio signals are output by the speakers 932, 934 whenever the microphone signals $x_l(k)$, $x_p(k)$ are themselves sufficiently decorrelated. Only if the audio signals $x_m(k)$, $x_p(k)$ are strongly correlated, the audio signal processor 710, which introduces some distortion into the audio signals, is activated. Thus, the audio signal processor 710 is only activated when it is essential to decorrelate the microphone signals $x_l(k)$, $x_p(k)$.

In the following, the ideas of the present invention will be summarized. It should be noted that according to known methods, it is difficult to achieve a maximum decorrelation (between at least two audio channels) while guaranteeing that introducing a varying time/phase difference between left channel and right channel does not result in a perceived shift and/or alteration of the perceived stereo image. This arises from several aspects:

Interaural phase difference and/or time difference is a relevant perceptual parameter for subjective perception of a sound stage (cf. e.g. [Bla97]) and has been used extensively in synthesis of stereo images (cf. interaural time difference IDT, as described for example in [Bau03] and in [Fal03]). Consequently, a change in perceived stereo image can only be avoided if the introduced time difference and/or phase difference stays below a threshold of perception, as they occur for audio signals that are reproduced via loudspeakers.

Optimal AEC convergence enhancement can be achieved if the preprocessing introduces time differences and/or phase differences just at the threshold of perception, i.e. applies the full amount of tolerable (time or phase) change.

As is known from psychoacoustics and acoustics, the sensitivity to phase difference is very high at low frequencies, and gradually reduces for increasing frequencies, until it fully vanishes for frequencies above about 4 kHz.

Neither a time delay modulation nor time-varying allpass filtering offer the flexibility to tailor the amount of time shifting and/or phase shifting as a function of frequency, such that the full potential of perceptually tolerable change is exploited.

Based on the above-described insight, the inventive concept for audio signal decorrelation multi-channel processing has been developed. In the following, the inventive novel method will be described. It should be noted here that it is the objective of the proposed method to provide both good correlation properties for the enhancement of AEC convergence and minimal alteration of the perceived stereo image.

The novel concept for convergence enhancement of AEC processing (which comprises the decorrelation of two audio signals, in a multi-channel audio signal processing) is based on the following consideration:

Time-varying modulation of the phase of the audio signal is an effective method which produces minimal perceived distortion for human listeners while not requiring a computationally expensive masking model.

In order to achieve maximum decorrelation impact while not exceeding the thresholds of human auditory perception in an obtrusive way, it is important to consider the human perceptual sensitivity towards phase differences, which is highest at low frequencies and diminishes with increasing frequency. Above 4 kHz, absolute phase can be considered as practically irrelevant to the human auditory system.

The preprocessing unit allows frequency selective choice of phase modulation parameters (modulation frequency, modulation amplitude, and modulation waveform) by employing an analysis filterbank and a synthesis filterbank (in general, a frequency analyzer and a combiner).

The basic scheme for preprocessing of an audio channel 310 is illustrated in FIG. 3. In other words, FIG. 3 shows a graphical representation of a basic preprocessing scheme for a single audio channel.

The input audio signal 310 is decomposed into spectral coefficients or subband signals 314, 316, 318 by means of the analysis filterbank 312. In a subsequent processing step (executed in the partial signal modifiers 332, 334, 336), the spectral coefficients or subband signals 314, 316, 318 are modified in their phase, based on a modulator input signal ($\phi_1$, $\phi_2$, $\phi_3$). In the general case, a different modulator signal $\phi_1$, $\phi_2$, $\phi_3$ can be used for each spectral coefficient or subband signal 314, 316, 318 according to its corresponding frequency range.

As an example, spectral coefficients belonging to a low frequency part of an audio signal may be left untouched, while spectral coefficients corresponding to frequencies above 4 kHz may be modulated heavily. In other words, for example the third partial signal 318 representing the audio content in a third audio frequency range may remain unprocessed, so that the synthesis filterbank 350 receives the unprocessed third partial signal. In contrast, the first and second partial signals 314, 316 may be processed, i.e. exposed to a time-varying phase shift or time delay operation, so that the synthesis filterbank receives the first processed partial signal and the second processed partial signal. In this example, the first audio frequency range corresponding to the first partial signal comprises higher frequencies than the second audio frequency range corresponding to the second partial signal, and the second audio frequency range comprises higher frequencies than the third audio frequency range corresponding to the third partial signal.

Finally, the (at least partially) modified spectral coefficients or subband signals 342, 344, 346 are converted back into a time domain representation 352 by using a synthesis filterbank 350.

The term filterbank comprises known filterbanks like Pseudo-QMF filterbanks, Polyphase filterbanks and other filterbanks, as well as known transforms, such as the Discrete Fourier Transform (DFT), the Complex Lapped Transform, and other transforms. In order to allow easy modification of the signal phase, it is advantageous to employ for the analysis filterbank 312 and/or for the synthesis filterbank 350 a filterbank type (or filterbank types) with a complex-valued representation. In this case, a simple phase modification may consist of a complex (or complex-valued) multiplication of the spectral coefficient (contained in the partial signals 314, 316, 318) with a value of $e^{j\phi}$, where $\phi$ denotes an intended phase shift in units of radians.

In order to simplify the modulation process, a practical choice is to use the same modulation waveform for all subbands with different scaling (such as a low amplitude at low frequency subbands, and a high modulation amplitude at high frequency subbands). In other words, the same modulation waveform is applied in the modulation of all partial signals to be phase shifted, wherein a larger amplitude of the phase shift (i.e. a larger maximum phase shift) is applied to partial signals describing an audio frequency range having higher frequencies, when compared to an audio frequency range having not so high frequencies. In other words, a high frequency subband is a subband of the input audio signal which comprises higher frequencies when compared to a low frequency subband.

As is known from communication theory, a frequency modulation is introduced as a consequence of the phase modulation processing, with a frequency shift that is proportional to the time derivative of the phase modulation. Therefore, in order to avoid a perceptible frequency modulation of the output audio signal, it is advantageous to choose a smooth modulation function, such as a sine wave, and a not too high modulation frequency (e.g. below 5 Hz). However, the modulation function does not necessarily need to be periodic, but could alternatively be a random function of time as well (cf. [Ali05]).

FIG. 4 illustrates an example preprocessing system for application to the two channels 410, 412 of a stereo audio signal. In other words, FIG. 4 shows an example of a preprocessing for a stereo pair of audio channels. A common modulator function 438 is used for both channels 410, 412 and all subbands (or partial signals 432, 452). In order to simplify the graphical representation of FIG. 4, an amplitude scaling of the modulation for different spectral subbands (or different partial signals 432, 452) has been omitted in FIG. 4. In order to produce a time-varying phase difference between the output signals, the exemplary circuit of FIG. 4 is adapted to apply a common modulator function to both channels 410, 412 in a conjugate complex way. In other words, a phase offset introduced into the left channel 410 has an opposite sign when compared to a phase offset introduced into the right channel signal 412.

FIG. 6 illustrates how the proposed technique and concepts can be applied as AEC convergence enhancement for multi channel audio signals, such as the popular 5-channel surround sound. In other words, FIG. 6 shows an example of preprocessing for 5-channel surround sound. The surround setup usually consists of a left front (L) speaker, a right front (R) speaker, a center (C) speaker, a left surround (Ls) speaker, and a right surround (Rs) speaker. In the exemplary arrangement of FIG. 6, three independent modulators 620, 630, 640 are used which modulate the L/R channel pair, the Ls/Rs channel pair and the C channel, respectively. In other words, the first modulator or dual channel audio signal processor 620 modulates the left front channel 610 and the right front channel 612, to obtain a decorrelated left front channel signal $L_{out}$ and a decorrelated right front channel signal $R_{out}$, the second modulator or dual channel audio signal processor 630 receives the left surround channel signal 614 and the right surround channel signal 616, and derives therefrom the decorrelated left surround channel signal $Ls_{out}$ and the decorrelated right surround channel signal $Rs_{out}$. The audio signal decorrelator or modulator 640 receives the center speaker signal $C_{in}$ and derives therefrom a decorrelated center signal $C_{out}$.

Similarly to the arrangement 400 of FIG. 4, the modulation of channel pairs is carried out in a complex conjugated fashion. In other words, a phase shift introduced into the decorrelated left front channel signal $L_{out}$ with respect to the left front channel signal 610 has same magnitude and opposite direction when compared with the phase shift introduced into the decorrelated right front channel signal $R_{out}$ with respect to the right front channel audio signal 612.

Further, the phase shift introduced into the processed left surround channel audio signal $Ls_{out}$ with respect to the left surround channel audio signal 614 has identical magnitude and opposite sign when compared to the phase shift introduced into the processed right surround channel audio signal $Rs_{out}$ with respect to the right surround channel audio signal 616.

The modulation frequencies of the three modulators 660, 662, 664 (which generate signals indicating the magnitude of the phase shift in the first two channel audio signal processor 620, in the second two channel audio signal processor 630, and in the audio signal decorrelator 640) are chosen such that they are not too high, i.e. smaller than 5 Hz, to avoid perceptible frequency modulation. Furthermore, the modulation frequencies are chosen such that they are not commensurate, such that they provide "orthogonal" modulation across the different modulators. In other words, the modulation frequencies are chosen such that a quotient of any two modulation frequencies is not an integer value.

As an example, a modulation period of 1.3 seconds can be used for the L/R processing (in the first dual channel audio signal processor 620), a modulation period of 3 seconds can be used for the C processing (in the audio signal decorrelator 640), and a modulation period of 1.1 seconds can be used for the Ls/Rs processing (in the second two channel audio signal processor 630). Again, in order to simplify the drawing of FIG. 6, a frequency dependent amplitude scaling of the modulation signal for different spectral subbands has been omitted in the drawing, but may be present in an actual implementation (cf. FIG. 5).

Figure 8A:
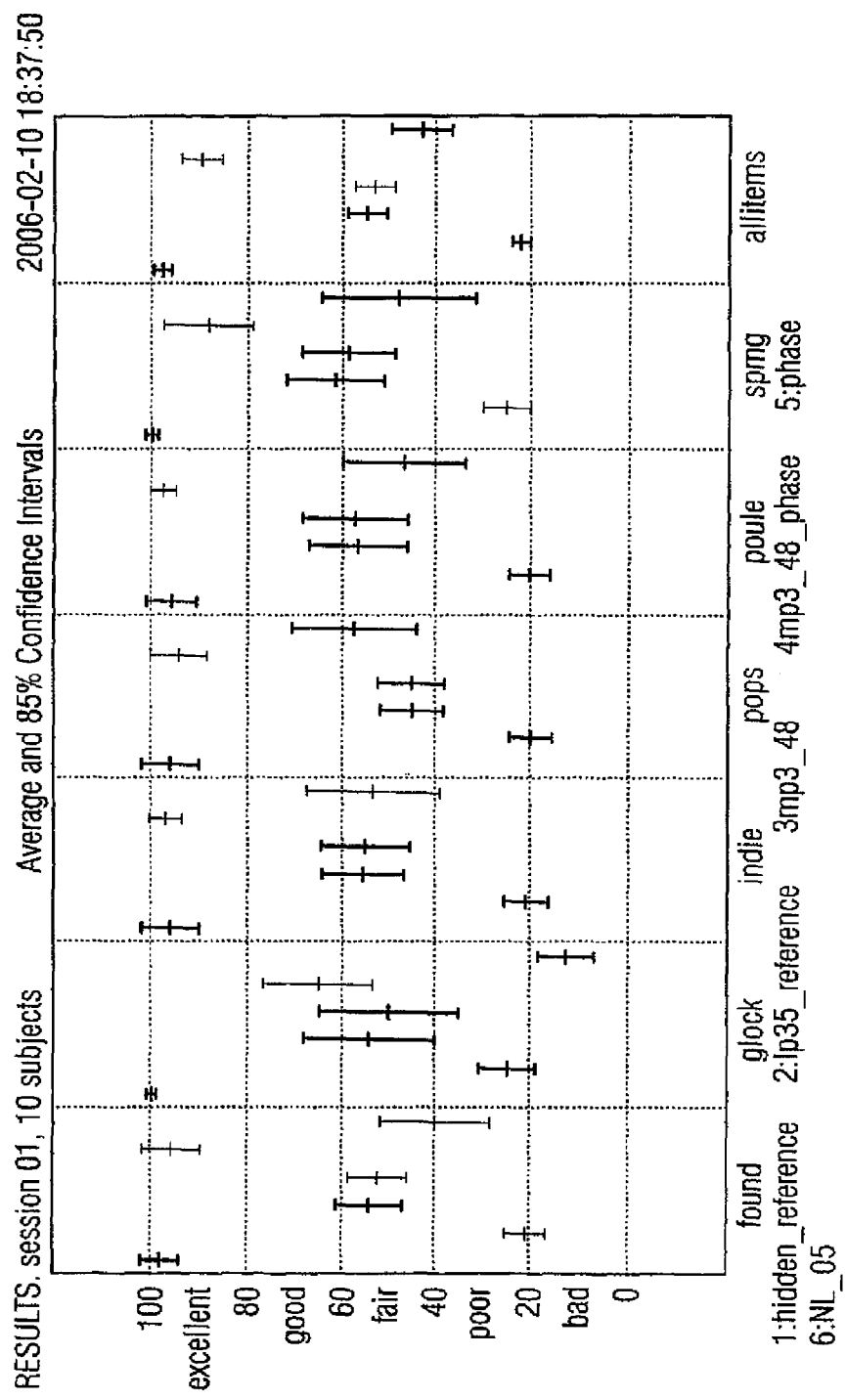
FIG. 8A shows a graphical representation of a subjective sound quality of various preprocessing methods for a surround sound.

FIG. 8A illustrates the results of a subjective listening test which assesses the sound quality of preprocessed 5-channel surround sound material for various types of preprocessing algorithms. In other words, FIG. 8A describes a subjective sound quality of various preprocessing methods for a surround sound. The sound quality is quantified on a scale from 0 (very bad quality) to 100 (indistinguishable from original) for 6 sound excerpts (items "fount", "glock", "indie", "pops", "poule", "spmg") and the average over all items. The different preprocessing methods are the original reference and a 3.5 kHz band-limited version thereof (both included for reasons of standardized test methodology only), coding of each individual channel by an mp3 encoder/decoder running at 48 kbit/s per channel ("mp3 48"), the inventive phase modulation method as described previously ("phase"), a combination of mp3 encoding/decoding and the inventive phase modulation method ("mp3 48 phase") and the state of the art non-linear processing ("NL"; cf. [Mor01]). It is visible from the graph of FIG. 8a that the phase modulation method emerges as the clear winner in terms of sound quality. Furthermore, it can be combined with other preprocessing methods without noticeable further degradation of the sound quality.

In other words, it can be seen from FIG. 8A that a subjective listening impression of the signal processed using the inventive concept is almost persistently rated to be excellent (i.e. in a range between 80 and 100 rating units). So, the subjective listening impression of the signal produced by the inventive method is almost as good as the listening impression produced by the reference signal. In contrast, signals decorrelated using other methods are typically rated to produce a worse listening impression.

Figure 8B:
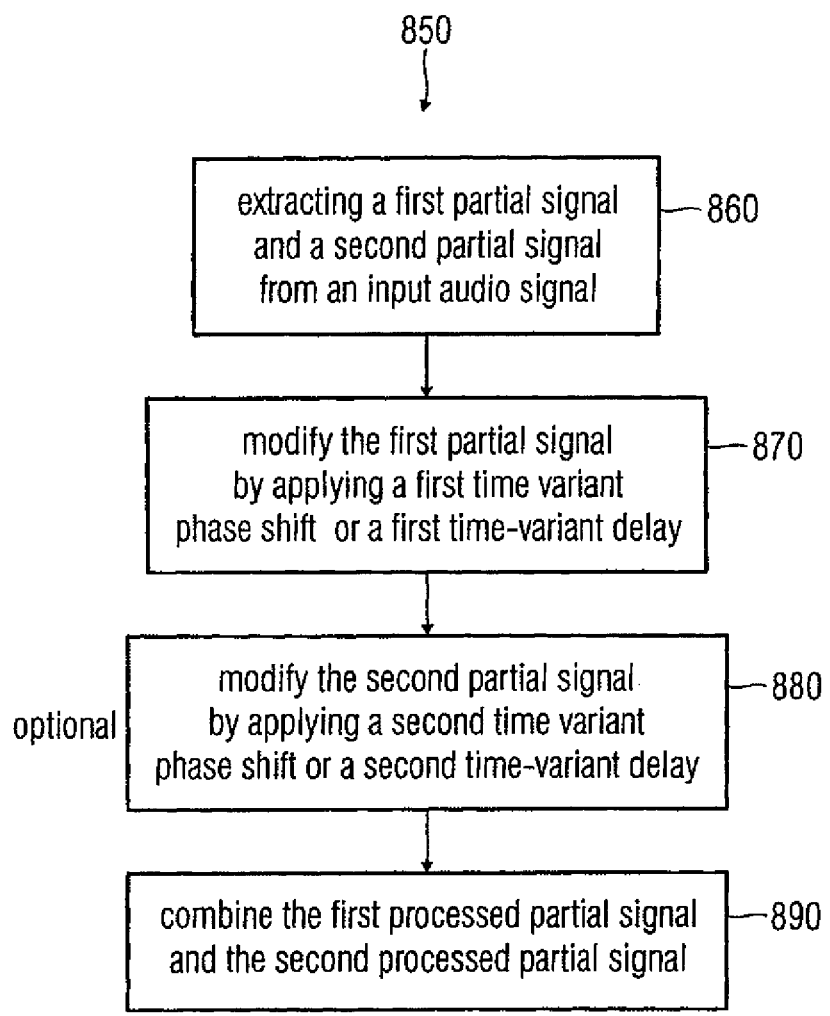
FIG. 8B shows a flow chart of an inventive method for decorrelating an input audio signal, according to an eighth embodiment of the present invention.

FIG. 8B shows a flowchart of the inventive method deriving an output audio signal from the input audio signal, the output audio signal being decorrelated from the input audio signal. The method of FIG. 9 is designated in its entity with 850. The method 850 comprises a first step 860 of extracting a first partial signal and a second partial signal from an input audio signal. The first partial signal is descriptive of an audio content in a first audio frequency range, and the second partial signal is descriptive of an audio content in a second audio frequency range. The first audio frequency range comprises higher frequencies compared to the second audio frequency range.

A second step 870 comprises modifying the partial signal by applying a first time variant phase shift or a first time variant delay.

A third optional step 880 comprises modifying the second partial signal by applying a second time variant delay or a second time variant phase shift to the second partial signal. Modifying the first partial signal, to obtain a first processed partial signal, and the second partial signal, to obtain a second processed partial signal, is executed such that a modulation amplitude of a time variant phase shift or time variant delay applied to the first partial signal is higher than a modulation amplitude of a time variant phase shift or a time variant delay applied to the second partial signal.

The inventive method further comprises combining the first processed partial signal and the second processed partial signal in a fourth step 890.

The third step 880 of modifying the second partial signal may optionally be omitted. In this case, only the first partial signal is modified, such that a time variant phase shift or time variant delay is applied to the first partial signal (while no time variant phase shift or time variant delay is applied to the second partial signal). In this case, the step 940 comprises combining the first processed partial signal and the second partial signal, to obtain the output audio signal.

It should be noted, that the inventive method can be supplemented by any steps or functionalities performed by the inventive audio signal decorrelator.

Furthermore, the inventive method can be supplemented by any functionality executed in the inventive dual channel audio signal processor, multi channel audio signal processor or five channel audio signal processor.

To summarize the above, the present invention creates a method for preprocessing including an analysis filterbank and a synthesis filterbank and a modification stage per audio channel. According to an aspect of the invention, the modification stage only modulates a signal phase. According to another aspect of the present invention, the filterbank is complex valued. According to a further aspect of the present invention, different modulation functions are used for different frequency regions.

According an aspect of the invention, a modulation signal comprises an amplitude scaled over a subband frequency, wherein more modulation is introduced at higher frequencies. According to another aspect of the invention, the same modulator function is shared, in a scaled way, across frequency. According to a further aspect of the invention, the modulation signal (or modulation function) is smooth, for example a sine, and does not vary too fast. According to a further aspect of the invention, a conjugate complex modulation of channel pairs is performed.

Depending on certain implementation requirements of the inventive methods, the inventive methods can be implemented in hardware or in software. The implementation can be performed using a digital storage medium, for example a disk, DVD, CD, ROM, PROM, EPROM, EEPROM or FLASH memory having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

To summarize the above, the present invention creates a concept for decorrelating an audio signal or a plurality of audio signals, which allows to efficiently exploit the human perception threshold for this variations. According to the present invention, phase shifts can be introduced in dependence on frequency, so that in different audio frequency ranges, time variant phase shift of different magnitude is introduced, which is adapted to the human perception threshold. Furthermore, the concept of the present invention comprises moderate requirements with respect to resource consumption.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

References:

[Hae92] E. Hänsler, "The hands-free telephone problem—An annotated bibliography," Signal Processing, vol. 27, no. 3, pp. 259-271, 1992.

[Bre99] C. Breining, P. Dreiseitel, E. Hänsler, A. Mader, B. Nitsch, H. Puder, Th. Schertler, G. Schmidt, J. Tilp, "Acoustic echo control," IEEE Signal Processing Magazine, vol. 16, no. 4, pp. 42-69, July 1999.

[Kel84] W. Kellermann, "Kompensation akustischer Echos in Frequenzteilbändern," in Proc. Aachener Kolloquium, pp. 322-325, 1984.

[Shi95] S. Shimauchi and S. Makino, "Stereo projection echo canceller with true echo path estimation," Proc. IEEE Int. Conf. On Acoustics, Speech, and Signal Processing, pp. 3059-3062, May 1995.

[Gae00] T. Gänsler and J. Benesty, "Stereophonic acoustic echo cancellation and two-channel adaptive filtering: an overview," Int. Journal of Adaptive Control and Signal Processing, vol. 14, pp. 565-586, 2000.

[Buc01] H. Buchner and W. Kellermann, "Acoustic echo cancellation for two and more reproduction channels", Proc. Int. Workshop on Acoustic Echo and Noise Control, pp. 99-102, September 2001.

[Sug01] A. Sugiyama, Y. Joncour, and A. Hirano, "A stereo echo canceller with correct echo path identification based on an input-sliding technique", IEEE Trans. Signal Processing, 49(1), pp. 2577-2587, 2001.

[Ben98] M. M. Sondhi, D. R. Morgan, and J. L. Hall, "Stereophonic acoustic echo cancellation—An overview of the fundamental problem," IEEE Signal Processing Lett., vol. 2, pp. 148-151, August 1995

[Ben98] J. Benesty, D. R. Morgan, and M. M. Sondhi, "A better understanding and an improved solution to the specific problems of stereophonic acoustic echo cancellation," IEEE Trans. Speech Audio Processing, vol. 6, pp. 156-165, March 1998

[Mor01] D. R. Morgan, J. L. Hall, and J. Benesty, "Investigation of Several Types of Nonlinearities for Use in Stereo Acoustic Echo Cancellation," IEEE Trans. Speech Audio Processing, vol. 5, no. 6, pp. 686-696, September 2001

[Gae98] T. Gänsler and P. Eneroth, "Influence of audio coding on stereophonic acoustic echo Cancellation," Proc. IEEE Int. Conf. On Acoustics, Speech, and Signal Processing, pp. 3649-3652, 1998

[Beb98] J. Benesty, D. R. Morgan, J. L. Hall, and M. M. Sondhi, "Stereophonic acoustic echo cancellation using nonlinear transformations and comb filtering," Proc. IEEE Int. Conf. On Acoustic, Speech, and Signal Processing, pp. 3673-3676, 1998

[Ali05] U.S. Pat. No. 6,895,093B1, Acoustic Echo-Cancellation System

[Sug99] U.S. Pat. No. 6,577,731B1, Method and Apparatus of Cancelling Multi-Channel Echoes

[Sug98] U.S. Pat. No. 6,700,977B2, Method and Apparatus of Cancellation Multi-Channel Echo

[Neu98] C. Neubauer, J. Herre: "Digital Watermarking and Its Influence on Audio Quality", $105^{th}$ AES Convention, San Francisco 1998, Preprint 4823

[Bla97] J. Blauert, "Spatial Hearing: The Psychophysics of Human Sound Localization", revised edition, MIT Press, 1997

[Bau03] F. Baumgarte and C. Faller: "Binaural Cue Coding—Part I: Psychoacoustic fundamentals and design principles," IEEE Trans. On Speech and Audio Proc., vol. 11, no. 6, November 2003

[Fal03] C. Faller and F. Baumgarte, "Binaural Cue Coding—Part II: Schemes and applications," IEEE Trans. On Speech and Audio Proc., vol. 11, no. 6, November 2003

[Hoy99] T. Hoya, J. A. Chambers, P. A. Naylor, "Low Complexity $\epsilon$-NLMS Algorithms and Subband Structures for Stereophonic Acoustic Echo Cancellation", International Workshop in Acoustic Echo and Noise Control (IWAENC) 1999, Pocono Manor, USA, Conference Proceedings, pp. 36-39

The invention claimed is:

1. An audio signal decorrelator for deriving an output audio signal from an input audio signal, the audio signal decorrelator comprising:

a frequency analyzer for extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;

a modulation function generator to produce a time-variant modulation function;

a partial signal modifier adapted to time-variantly modify the first partial signal in dependence on the time-variant modulation function produced by the modulation function generator, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or to time-variantly modify only the first partial signal in dependence on the time-variant modulation function produced by the modulation function generator, so that a time variant phase shift or a time variant delay is applied to the first partial signal; and a signal combiner for combining the first processed partial signal and the second processed partial signal, or for combining the first processed partial signal and the second partial signal, to acquire an output audio signal; wherein the frequency analyzer comprises an analysis filterbank adapted to decompose the input audio signal into at least two spectral coefficients, a first spectral coefficient being descriptive of the audio content in the first audio frequency range, the first spectral coefficient forming the first partial signal, a second spectral coefficient being descriptive of the audio content in the second audio frequency range, the second spectral coefficient forming the second partial signal;

the partial signal modifier is adapted to modulate a phase at least of the first spectral coefficient, to acquire the first processed partial signal, or to modulate the phase of the first spectral coefficient, to acquire the first processed partial signal, and a phase of the second spectral coefficient, to acquire a second processed partial signal; and the signal combiner comprises a synthesis filterbank adapted to combine the processed first partial signal and the second partial signal to acquire the output audio signal as a time domain signal, or to combine the processed first partial signal and the processed second partial signal to acquire the output audio signal as a time domain signal.

2. The audio signal decorrelator according to claim 1, wherein the frequency analyzer is adapted to decompose temporal blocks of the input audio signal into a plurality of spectral coefficients, such that the first partial signal comprises a time sequence of first spectral coefficients, and such that the second partial signal comprises a time sequence of second spectral coefficients;

wherein the partial signal modifier is adapted to process at least the first partial signal to acquire the first processed partial signal as a time sequence of processed first spectral coefficients, and wherein the synthesis filterbank is adapted to combine the time sequence of spectral coefficients of the first processed partial signal and the time sequence of spectral coefficients of the second partial signal or the second processed partial signal into the time domain output audio signal.

3. The audio signal decorrelator according to claim 1, wherein the frequency analyzer is adapted to provide the spectral coefficients as complex values;

wherein the partial signal modifier is adapted to time-variantly modulate a phase of the first spectral coefficient or of the first spectral coefficients by multiplying or dividing the first spectral coefficient or the first spectral coefficients with a first plurality of time variant complex values ($e^{j\phi 1}$) comprising a predetermined, identical, time invariant magnitude and a time variant phase.

4. The audio signal decorrelator according to claim 3, wherein the audio signal decorrelator is adapted to derive the time variant phase of the complex values of the first plurality of time variant complex values from values of the modulation function at different instances of time.

5. The audio signal decorrelator according to claim 4, wherein the modulation function generator is adapted to produce a sinusoidal function of time as the modulation function.

6. The audio signal decorrelator according to claim 4, wherein the modulation function generator is adapted to produce the modulation function in such a way that a modulation frequency introduced into the audio content represented by the first partial signal due to a time variation of the phase of the time variant complex values of the first plurality of time variant complex values is smaller than 10 Hz.

7. The audio signal decorrelator according to claim 4, wherein the modulation function generator is adapted to produce a periodic modulation time function comprising a frequency of less than 10 Hz.

8. The audio signal decorrelator according to claim 4, wherein the modulation function generator is adapted to produce a random or pseudo-random function of time.

9. The audio signal decorrelator according to claim 4, wherein the partial signal modifier is adapted to modulate phases of the spectral coefficients of the second partial signal by multiplying or dividing the second spectral coefficient or the second spectral coefficients with a second plurality of time variant complex values comprising a predetermined, identical, time invariant magnitude and a time-variant phase; and wherein the audio signal decorrelator is adapted to derive time variant phases of the complex values of the second plurality of time variant complex values from values of the modulation function at different instances of time.

10. The audio signal decorrelator according to claim 9, further comprising a scaler adapted to scale the modulation time function with a first time-invariant scalar value to acquire the time variant phase of the complex values of the first plurality of time variant complex values, and to scale the modulation time function with a second time-invariant scalar value to acquire the time variant phase of the complex values of the second plurality of the time variant complex values;

wherein an absolute value or a magnitude of the first scalar value is larger than an absolute value or a magnitude of the second scalar value, such that a phase shift modulation amplitude applied to the first partial signal is larger than a phase shift modulation amplitude applied to the second partial signal.

11. The audio signal decorrelator according to claim 1, wherein the frequency analyzer is adapted to extract a third partial signal from the input audio signal, the third partial signal being descriptive of an audio content in a third audio frequency range, the first audio frequency range comprising higher frequencies compared to the second audio frequency range, and the second audio frequency range comprising higher frequencies compared to the third audio frequency range;

wherein the partial signal modifier is adapted to modify the first partial signal, to acquire a first processed partial signal, to modify the second partial signal, to acquire a second processed partial signal, and to modify the third partial signal, to acquire a third processed partial signal, so that a time variant phase shift modulation is applied to the first partial signal which comprises a larger modulation amplitude than a time variant phase shift modulation applied to the second partial signal, wherein a modulation amplitude of the time-variant phase shift applied to the second partial signal is larger than a modulation amplitude of a time variant phase shift applied to the third partial signal; and wherein the signal combiner is adapted to combine the first processed partial signal, the second processed partial signal and the third processed partial signal, to acquire the output audio signal.

12. The audio signal decorrelator according to claim 1, wherein a lower frequency border of the first audio frequency range is larger than 1.1 kHz.

13. A multi channel audio signal processor for decorrelating a first channel audio signal and a second channel audio signal, to acquire a first decorrelated output audio signal and a second decorrelated output audio signal, the multi channel audio signal processor comprising:
- a first audio signal decorrelator for deriving an output audio signal from an input audio signal, the audio signal decorrelator comprising:
- a frequency analyzer for extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;
- a modulation function generator to produce a time-variant modulation function;
- a partial signal modifier adapted to time-variantly modify the first partial signal in dependence on the time-variant modulation function produced by the modulation function generator, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or to time-variantly modify only the first partial signal in dependence on the time-variant modulation function produced by the modulation function generator, so that a time variant phase shift or a time variant delay is applied to the first partial signal; and
- a signal combiner for combining the first processed partial signal and the second processed partial signal, or for combining the first processed partial signal and the second partial signal, to acquire an output audio signal, wherein the first audio signal decorrelator is adapted to receive as the input audio signal the first channel audio signal, and wherein the output audio signal of the first audio signal decorrelator forms the first decorrelated output audio signal; wherein
the second channel audio signal or a signal derived therefrom forms the second decorrelated output audio signal;
the first audio signal decorrelator is adapted such that audio contents in the first audio frequency range of the first decorrelated output audio signal and of the second decorrelated output audio signal comprise a stronger time-variant phase shift modulation with respect to each other than audio contents in the second audio frequency range of the first decorrelated output audio signal and of the second decorrelated audio output signal;
the frequency analyzer comprises an analysis filterbank adapted to decompose the input audio signal into at least two spectral coefficients, a first spectral coefficient being descriptive of the audio content in the first audio frequency range, the first spectral coefficient forming the first partial signal, a second spectral coefficient being descriptive of the audio content in the second audio frequency range, the second spectral coefficient forming the second partial signal;
the partial signal modifier is adapted to modulate a phase at least of the first spectral coefficient, to acquire the first processed partial signal, or to modulate the phase of the first spectral coefficient, to acquire the first processed partial signal, and a phase of the second spectral coefficient, to acquire a second processed partial signal; and
the signal combiner comprises a synthesis filterbank adapted to combine the processed first partial signal and the second partial signal to acquire the output audio signal as a time domain signal, or to combine the processed first partial signal and the processed second partial signal to acquire the output audio signal as a time domain signal.

14. The multi channel audio signal processor according to claim 13, further comprising a second audio signal decorrelator, the second audio signal decorrelator comprising:
- a frequency analyzer for extracting a third partial signal and a fourth partial signal from the second channel audio signal, the third partial signal being descriptive of an audio content in a third audio frequency range, the fourth partial signal being descriptive of an audio content in a fourth audio frequency range, the third audio frequency range comprising higher frequencies than the fourth audio frequency range;
- a partial signal modifier for modifying the third partial signal to acquire a third processed partial signal, so that a modulation amplitude of a time variant phase shift or a time variant delay applied to the third partial signal is larger than a modulation amplitude of a time variant phase shift or a time variant delay applied to the fourth partial signal, or for modifying only the third partial signal, so that a time variant phase shift or a time variant delay is applied to the third partial signal; and
- a signal combiner for combining the third processed partial signal and the fourth processed partial signal, to acquire the second decorrelated output signal, or for combining the third processed partial signal and the fourth partial signal, to acquire the second decorrelated output signal.

15. The audio signal processor according to claim 13, further comprising a second audio signal decorrelator for deriving an output audio signal from an input audio signal, the audio signal decorrelator comprising:
- a frequency analyzer for extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;
- a partial signal modifier for modifying the first partial signal, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or for modifying only the first partial signal, so that a time variant phase shift or a time variant delay is applied to the first partial signal; and
- a signal combiner for combining the first processed partial signal and the second processed partial signal, or for combining the first processed partial signal and the second partial signal, to acquire an output audio signal,
wherein the first audio frequency range of the first audio signal decorrelator comprises higher frequencies than the second audio frequency range of the second audio signal decorrelator,
wherein the first audio frequency range of the first audio signal decorrelator overlaps with the first audio frequency range of the second audio signal decorrelator in a first overlap audio frequency range, wherein the second audio frequency range of the first audio signal decorrelator overlaps with the second audio frequency range of the second audio signal decorrelator in a second overlap audio frequency range;

wherein the second audio signal decorrelator is adapted to receive as the input audio signal the second channel input audio signal;

wherein the output audio signal of the second audio signal decorrelator forms the decorrelated second output audio signal;

wherein the first audio signal decorrelator and the second audio signal decorrelator are adapted such that the time variant phase shift or time variant delay introduced into the first partial signal of the first audio signal decorrelator is different from the time variant phase shift or time variant delay introduced into the first partial signal of the second audio signal decorrelator.

16. The multi channel audio signal processor according to claim 15, wherein the first signal decorrelator is adapted to adjust the time variant delay or time variant phase shift in its first audio frequency range based on a first phase shift value, and to adjust the time variant delay or time variant phase shift in its second audio frequency range based on a second phase shift value;

wherein the second audio signal decorrelator is adapted to adjust the time variant delay or the time variant phase shift in its first audio frequency range based on a third phase shift value, and to adjust the time variant delay or time variant phase shift in its second audio frequency range based on a fourth phase shift value; and wherein the multi channel audio signal processor further comprises a scaler adapted to derive the first phase shift value, the second phase shift value, the third phase shift value and the fourth phase shift value from a common modulation time function by scaling the modulation time function, to acquire scaled values, and deriving the phase shift values from the scaled values.

17. The multi channel audio signal processor according to claim 16, wherein the first audio signal decorrelator, the second audio signal decorrelator and the scaler are adapted such that a phase shift applied in the first overlap audio frequency range by the first audio signal decorrelator comprises an opposite direction when compared to a phase shift applied in the first overlap audio frequency range by the second audio signal decorrelator, and that a phase shift applied in the second overlap audio frequency range by the first audio signal decorrelator comprises an opposite direction when compared to a phase shift applied in the second overlap audio frequency range by the second audio signal decorrelator.

18. The multi channel audio signal processor according to claim 16, wherein the first audio signal decorrelator, the second audio signal decorrelator and the scaler are adapted such that a phase shift applied in the first overlap audio frequency range by the first audio signal decorrelator comprises the same magnitude as a phase shift applied in the first overlap audio frequency range by the second audio signal decorrelator, and that a phase shift applied in the second overlap audio frequency range by the first audio signal decorrelator comprises the same magnitude as a phase shift applied in the second overlap audio frequency range by the second audio signal decorrelator.

19. The multi channel audio signal processor according to claim 15, wherein the first audio signal decorrelator comprises an analysis filterbank adapted to decompose the first channel audio signal into at least two spectral coefficients, a first spectral coefficient being descriptive of the audio content in the first audio frequency range, the first spectral coefficient forming the first partial signal, a second spectral coefficient being descriptive of the audio content in the second audio frequency range, the second spectral coefficient forming the second partial signal;

wherein the second audio signal decorrelator comprises an analysis filterbank adapted to decompose the second channel audio signal into at least two spectral coefficients, a third spectral coefficient being descriptive of the audio content in the second audio frequency range, the third spectral coefficient forming the first partial signal of the second audio signal decorrelator, a fourth spectral coefficient being descriptive of the audio content in the second audio frequency range, the fourth spectral coefficient forming the second partial signal of the second audio signal decorrelator, wherein the multi channel audio signal processor, the first audio signal decorrelator and the second audio signal decorrelator are adapted to achieve that in a given time interval, the first spectral coefficient and the third spectral coefficient are multiplied with values being complex conjugate with respect to each other, or to achieve that in the given time interval, the first spectral coefficient is multiplied with a complex value of magnitude 1, while the third spectral coefficient is divided by the same complex value.

20. An audio signal processor for receiving a first channel audio signal, a second channel audio signal, a third channel audio signal, a fourth channel audio signal and a fifth channel audio signal being part of a multi channel audio signal, the audio signal processor comprising:

a first multi channel audio signal processor for decorrelating a first channel audio signal and a second channel audio signal, to acquire a first decorrelated output audio signal and a second decorrelated output audio signal, the multi channel audio signal processor comprising:

a first audio signal decorrelator for deriving an output audio signal from an input audio signal, the audio signal decorrelator comprising:

a frequency analyzer for extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;

a modulation function generator to produce a time-variant modulation function;

a partial signal modifier adapted to time-variantly modify the first partial signal in dependence on the time-variant modulation function produced by the modulation function generator, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or to time-variantly modify only the first partial signal in dependence on the time-variant modulation function produced by the modulation function generator, so that a time variant phase shift or a time variant delay is applied to the first partial signal; and a signal combiner for combining the first processed partial signal and the second processed partial signal, or for combining the first processed partial signal and the second partial signal, to acquire an output audio signal, wherein the first audio signal decorrelator is adapted to receive as the input audio signal the first channel audio signal, and wherein the output audio signal of the first audio signal decorrelator forms the first decorrelated output audio signal; wherein the second channel audio signal or a signal derived therefrom forms the second decorrelated output audio signal; and the first audio signal decorrelator is adapted such that audio contents in the first audio frequency range of the first decorrelated output audio signal and of the second decorrelated output audio signal comprise a stronger time-variant phase shift modulation with respect to each other than audio contents in the second audio frequency range of the first decorrelated output audio signal and of the second decorrelated audio output signal, wherein the first multi channel audio signal processor receives as its first channel audio signal the first channel audio signal of the multi channel signal, and wherein the first multi channel audio signal processor receives as its second channel audio signal the second channel audio signal of the multi channel signal;

a second multi channel audio signal processor for decorrelating a first channel audio signal and a second channel audio signal, to acquire a first decorrelated output audio signal and a second decorrelated output audio signal, the multi channel audio signal processor comprising:

a first audio signal decorrelator for deriving an output audio signal from an input audio signal, the audio signal decorrelator comprising:

a frequency analyzer for extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;

a partial signal modifier adapted to time-variantly modify the first partial signal, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or to time-variantly modify only the first partial signal, so that a time variant phase shift or a time variant delay is applied to the first partial signal; and a signal combiner for combining the first processed partial signal and the second processed partial signal, or for combining the first processed partial signal and the second partial signal, to acquire an output audio signal, wherein the first audio signal decorrelator is adapted to receive as the input audio signal the first channel audio signal, and wherein the output audio signal of the first audio signal decorrelator forms the first decorrelated output audio signal;

the second channel audio signal or a signal derived therefrom forms the second decorrelated output audio signal; and the first audio signal decorrelator is adapted such that audio contents in the first audio frequency range of the first decorrelated output audio signal and of the second decorrelated output audio signal comprise a stronger time-variant phase shift modulation with respect to each other than audio contents in the second audio frequency range of the first decorrelated output audio signal and of the second decorrelated audio output signal, wherein the second multi channel audio signal processor receives as its first channel audio signal the third channel audio signal of the multi channel signal, and wherein the second multi channel audio signal processor receives as its second channel audio signal the fourth channel audio signal of the multi channel signal; and an audio signal decorrelator for deriving an output audio signal from an input audio signal, the audio signal decorrelator comprising:

a frequency analyzer for extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;

a partial signal modifier for modifying the first partial signal, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or for modifying only the first partial signal, so that a time variant phase shift or a time variant delay is applied to the first partial signal; and a signal combiner for combining the first processed partial signal and the second processed partial signal, or for combining the first processed partial signal and the second partial signal, to acquire an output audio signal, wherein the audio signal decorrelator receives as its input audio signal the fifth channel audio signal of the multi channel signal, the output signals of the first multi channel audio signal processor, the second multi channel audio signal processor and the audio signal decorrelator forming a decorrelated five channel signal;

the frequency analyzer comprises an analysis filterbank adapted to decompose the input audio signal into at least two spectral coefficients, a first spectral coefficient being descriptive of the audio content in the first audio frequency range, the first spectral coefficient forming the first partial signal, a second spectral coefficient being descriptive of the audio content in the second audio frequency range, the second spectral coefficient forming the second partial signal;

the partial signal modifier is adapted to modulate a phase at least of the first spectral coefficient, to acquire the first processed partial signal, or to modulate the phase of the first spectral coefficient, to acquire the first processed partial signal, and a phase of the second spectral coefficient, to acquire a second processed partial signal; and the signal combiner comprises a synthesis filterbank adapted to combine the processed first partial signal and the second partial signal to acquire the output audio signal as a time domain signal, or to combine the processed first partial signal and the processed second partial signal to acquire the output audio signal as a time domain signal.

21. The audio signal processor according to claim 20, wherein the first channel audio signal of the multi channel signal is a left front speaker signal;

wherein the second channel audio signal of the multi channel signal is a right front speaker signal;
wherein the third channel audio signal of the multi channel signal is a left rear speaker signal;
wherein the fourth channel audio signal of the multi channel signal is a right rear speaker signal; and
wherein the fifth channel audio signal of the multi channel signal is a center speaker signal.

22. The audio signal processor according to claim 20, wherein the first multi channel audio signal processor is adapted to apply the delays in its audio frequency range in dependence on phase shift values derived from a first modulation time function using scaling operations performed by a scaler;
wherein the second multi channel audio signal processor is adapted to apply the delays in its audio frequency ranges in dependence on phase shift values derived from a second modulation time function using scaling operations performed by a scaler; and
wherein the audio signal decorrelator is adapted to apply the delays in its audio frequency ranges in dependence on phase shift values derived from a third modulation time function using scaling operations.

23. The audio signal processor according to claim 22, wherein the first modulation time function, the second modulation time function and the third modulation time function are periodic functions, and wherein the first modulation time function, the second modulation time function and the third modulation time function comprise different frequencies.

24. An audio conference system, comprising:
an audio input for receiving a first channel audio signal and a second channel audio signal;
a multi channel audio signal processor for decorrelating a first channel audio signal and a second channel audio signal, to acquire a first decorrelated output audio signal and a second decorrelated output audio signal, the multi channel audio signal processor comprising:
a first audio signal decorrelator for deriving an output audio signal from an input audio signal, the audio signal decorrelator comprising:
a frequency analyzer for extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;
a modulation function generator to produce a time-variant modulation function;
a partial signal modifier adapted to time-variantly modify the first partial signal in dependence on the time-variant modulation function produced by the modulation function generator, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or to time-variantly modify only the first partial signal in dependence on the time-variant modulation function produced by the modulation function generator, so that a time variant phase shift or a time variant delay is applied to the first partial signal; and
a signal combiner for combining the first processed partial signal and the second processed partial signal, or for combining the first processed partial signal and the second partial signal, to acquire an output audio signal, wherein the first audio signal decorrelator is adapted to receive as the input audio signal the first channel audio signal, and wherein the output audio signal of the first audio signal decorrelator forms the first decorrelated output audio signal; wherein
the second channel audio signal or a signal derived therefrom forms the second decorrelated output audio signal; and
the first audio signal decorrelator is adapted such that audio contents in the first audio frequency range of the first decorrelated output audio signal and of the second decorrelated output audio signal comprise a stronger time-variant phase shift modulation with respect to each other than audio contents in the second audio frequency range of the first decorrelated output audio signal and of the second decorrelated audio output signal, the multi channel audio signal processor receiving the first channel audio signal and the second channel audio signal;
a first electroacoustic transducer for outputting the first decorrelated output audio signal provided by the multi channel audio signal processor;
a second electroacoustic transducer for outputting the second decorrelated output audio signal provided by the multi channel audio signal processor;
a microphone acoustically coupled with a first electroacoustic transducer an a second electroacoustic transducer, the microphone providing a microphone signal descriptive of the acoustic signal;
an echo cancellation unit for reducing or removing an audio content output by the first electroacoustic transducer from the microphone signal, and for reducing or removing an audio content output by the second electroacoustic transducer from the microphone signal,
the echo cancellation unit is adapted to filter the decorellated output audio signals in dependence on filter coefficients,
to remove or subtract the filtered version of the decorrelated output audio signals from the microphone signal, to acquire an echo-reduced microphone signal, and
to adjust the filter parameters in dependence on the echo-reduced microphone signal, to minimize an audio content output by the electroacoustic transducers in the echo-reduced microphone signal;
the frequency analyzer comprises an analysis filterbank adapted to decompose the input audio signal into at least two spectral coefficients, a first spectral coefficient being descriptive of the audio content in the first audio frequency range, the first spectral coefficient forming the first partial signal, a second spectral coefficient being descriptive of the audio content in the second audio frequency range, the second spectral coefficient forming the second partial signal;
the partial signal modifier is adapted to modulate a phase at least of the first spectral coefficient, to acquire the first processed partial signal, or to modulate the phase of the first spectral coefficient, to acquire the first processed partial signal, and a phase of the second spectral coefficient, to acquire a second processed partial signal; and
the signal combiner comprises a synthesis filterbank adapted to combine the processed first partial signal and the second partial signal to acquire the output audio signal as a time domain signal, or to combine the processed first partial signal and the processed second partial signal to acquire the output audio signal as a time domain signal.

25. A method for deriving an output audio signal from an input audio signal, the method comprising:
- extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;
- time-variantly modifying the first partial signal in dependence on a time-variant modulation function produced by a modulation function generator, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or time-variantly modifying only the first partial signal in dependence on the time-variant modulation function produced by the modulation function generator, so that a time variant phase shift or a time variant delay is applied to the first partial signal; and
- combining the first processed partial signal and the second processed partial signal, or combining the first processed partial signal and the second partial signal, to acquire an output audio signal; wherein
- the extracting step uses an analysis filterbank adapted to decompose the input audio signal into at least two spectral coefficients, a first spectral coefficient being descriptive of the audio content in the first audio frequency range, the first spectral coefficient forming the first partial signal, a second spectral coefficient being descriptive of the audio content in the second audio frequency range, the second spectral coefficient forming the second partial signal;
- the time-variantly modifying step includes modulating a phase at least of the first spectral coefficient, to acquire the first processed partial signal, or to modulate the phase of the first spectral coefficient, to acquire the first processed partial signal, and a phase of the second spectral coefficient, to acquire a second processed partial signal; and
- the combining step uses a synthesis filterbank adapted to combine the processed first partial signal and the second partial signal to acquire the output audio signal as a time domain signal, or to combine the processed first partial signal and the processed second partial signal to acquire the output audio signal as a time domain signal.

26. A method for decorrelating a first channel audio signal and a second channel audio signal, to acquire a first decorrelated output audio signal and a second decorrelated output audio signal, the method comprising:
- deriving an output audio signal from an input audio signal using a method for deriving an output audio signal from an input audio signal, the method comprising:
- extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;
- time-variantly modifying the first partial signal in dependence on a time-variant modulation function produced by a modulation function generator, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or time-variantly modifying only the first partial signal in dependence on the time-variant modulation function produced by the modulation function generator, so that a time variant phase shift or a time variant delay is applied to the first partial signal; and
- combining the first processed partial signal and the second processed partial signal, or combining the first processed partial signal and the second partial signal, to acquire an output audio signal, wherein the first channel audio signal forms the input audio signal, and wherein the output audio signal forms the first decorrelated output audio signal; and
- providing the second channel audio signal or a signal derived therefrom as the second decorrelated output audio signal; wherein
- the method for decorrelating is executed such that audio contents in the first audio frequency range of the first decorrelated output audio signal and of the second decorrelated output audio signal comprise a larger time-variant phase shift modulation amplitude with respect to each other than audio contents in the second audio frequency range of the first decorrelated output audio signal and of the second decorellated audio output signal;
- the extracting step uses an analysis filterbank adapted to decompose the input audio signal into at least two spectral coefficients, a first spectral coefficient being descriptive of the audio content in the first audio frequency range, the first spectral coefficient forming the first partial signal, a second spectral coefficient being descriptive of the audio content in the second audio frequency range, the second spectral coefficient forming the second partial signal;
- the time-variantly modifying step includes modulating a phase at least of the first spectral coefficient, to acquire the first processed partial signal, or to modulate the phase of the first spectral coefficient, to acquire the first processed partial signal, and a phase of the second spectral coefficient, to acquire a second processed partial signal; and
- the combining step uses a synthesis filterbank adapted to combine the processed first partial signal and the second partial signal to acquire the output audio signal as a time domain signal, or to combine the processed first partial signal and the processed second partial signal to acquire the output audio signal as a time domain signal.

27. A method for processing a multi channel audio signal, the method comprising:
- receiving a first channel audio signal, a second channel audio signal, a third channel audio signal, a fourth channel audio signal and a fifth channel audio signal being part of a multi channel audio signal;
- decorrelating the first channel audio signal and the second channel audio signal of the five channel audio signal using a method for decorrelating a first channel audio signal and a second channel audio signal, to acquire a first decorrelated output audio signal and a second decorrelated output audio signal, the method comprising:
- deriving an output audio signal from an input audio signal using a method for deriving an output audio signal from an input audio signal, the method comprising:
- extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;

time-variantly modifying the first partial signal in dependence on a time-variant modulation function produced by a modulation function generator, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or time-variantly modifying only the first partial signal in dependence on the time-variant modulation function produced by the modulation function generator, so that a time variant phase shift or a time variant delay is applied to the first partial signal; and combining the first processed partial signal and the second processed partial signal, or combining the first processed partial signal and the second partial signal, to acquire an output audio signal, wherein the first channel audio signal forms the input audio signal, and wherein the output audio signal forms the first decorrelated output audio signal; and providing the second channel audio signal or a signal derived therefrom as the second decorrelated output audio signal; wherein the method for decorrelating is executed such that audio contents in the first audio frequency range of the first decorrelated output audio signal and of the second decorrelated output audio signal comprise a larger time-variant phase shift modulation amplitude with respect to each other than audio contents in the second audio frequency range of the first decorrelated output audio signal and of the second decorellated audio output signal, to acquire two signals of a decorrelated multi channel signal;

decorrelating the third channel audio signal and the fourth channel audio signal of the multi channel audio signal using a method for decorrelating a first channel audio signal and a second channel audio signal, to acquire a first decorrelated output audio signal and a second decorrelated output audio signal, the method comprising:

deriving an output audio signal from an input audio signal according to the method for deriving an output audio signal from an input audio signal, the method comprising:

extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;

time-variantly modifying the first partial signal, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or time-variantly modifying only the first partial signal, so that a time variant phase shift or a time variant delay is applied to the first partial signal; and combining the first processed partial signal and the second processed partial signal, or combining the first processed partial signal and the second partial signal, to acquire an output audio signal, wherein the first channel audio signal forms the input audio signal, and wherein the output audio signal forms the first decorrelated output audio signal; and providing the second channel audio signal or a signal derived therefrom as the second decorrelated output audio signal;

the method for decorrelating is executed such that audio contents in the first audio frequency range of the first decorrelated output audio signal and of the second decorrelated output audio signal comprise a larger time-variant phase shift modulation amplitude with respect to each other than audio contents in the second audio frequency range of the first decorrelated output audio signal and of the second decorellated audio output signal, to acquire two further signals of the processed multi channel signal; and decorrelating the fifth channel audio signal of the multi channel audio signal using a method for deriving an output audio signal from an input audio signal, the method comprising:

extracting a first partial signal and a second partial signal from the input audio signal, the first partial signal being descriptive of an audio content in a first audio frequency range, the second partial signal being descriptive of an audio content in a second audio frequency range, the first audio frequency range comprising higher frequencies compared to the second audio frequency range;

time-variantly modifying the first partial signal, to acquire a first processed partial signal, and the second partial signal, to acquire a second processed partial signal, so that a modulation amplitude of a time variant phase shift or time variant delay applied to the first partial signal is higher than a modulation amplitude of a time variant phase shift or a time variant delay applied to the second partial signal, or time-variantly modifying only the first partial signal, so that a time variant phase shift or a time variant delay is applied to the first partial signal; and combining the first processed partial signal and the second processed partial signal, or combining the first processed partial signal and the second partial signal, to acquire an output audio signal, to acquire a fifth signal of the processed multi channel signal;

the extracting steps use an analysis filterbank adapted to decompose the input audio signal into at least two spectral coefficients, a first spectral coefficient being descriptive of the audio content in the first audio frequency range, the first spectral coefficient forming the first partial signal, a second spectral coefficient being descriptive of the audio content in the second audio frequency range, the second spectral coefficient forming the second partial signal;

the time-variantly modifying steps include modulating a phase at least of the first spectral coefficient, to acquire the first processed partial signal, or to modulate the phase of the first spectral coefficient, to acquire the first processed partial signal, and a phase of the second spectral coefficient, to acquire a second processed partial signal; and the combining steps use a synthesis filterbank adapted to combine the processed first partial signal and the second partial signal to acquire the output audio signal as a time domain signal, or to combine the processed first partial signal and the processed second partial signal to acquire the output audio signal as a time domain signal.

28. A non-transitory computer readable medium storing a computer program comprising program code for performing the method in accordance with claim 25 when the computer program runs on a computer.

29. A non-transitory computer readable medium storing a computer program comprising program code for performing the method in accordance with claim 26 when the computer program runs on a computer.

30. A non-transitory computer readable medium storing a computer program comprising program code for performing the method in accordance with claim 27 when the computer program runs on a computer.

* * * * *

UNITED STATES PATENT AND TRADEMARK OFFICE
CERTIFICATE OF CORRECTION

PATENT NO. : 8,538,037 B2  Page 1 of 1
APPLICATION NO. : 12/296698
DATED : September 17, 2013
INVENTOR(S) : Herre et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 749 days.

Signed and Sealed this

Fifteenth Day of September, 2015

Michelle K. Lee
*Director of the United States Patent and Trademark Office*